(12) United States Patent
Zhou

(10) Patent No.: US 11,128,899 B2
(45) Date of Patent: Sep. 21, 2021

(54) MEDIA DATA PROCESSING METHOD, COMPUTING DEVICE AND STORAGE MEDIUM

(71) Applicant: TENCENT TECHNOLOGY (SHENZHEN) COMPANY LIMITED, Shenzhen (CN)

(72) Inventor: Hongfei Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 40 days.

(21) Appl. No.: 16/654,555

(22) Filed: Oct. 16, 2019

(65) Prior Publication Data
US 2020/0053397 A1 Feb. 13, 2020

Related U.S. Application Data

(63) Continuation of application No. PCT/CN2018/116853, filed on Nov. 22, 2018.

(30) Foreign Application Priority Data

Dec. 4, 2017 (CN) .......................... 201711258239.9

(51) Int. Cl.
*H04N 21/2347* (2011.01)
*H04L 29/06* (2006.01)
(Continued)

(52) U.S. Cl.
CPC ......... *H04N 21/2347* (2013.01); *H04L 63/08* (2013.01); *H04L 67/1097* (2013.01);
(Continued)

(58) Field of Classification Search
CPC ............. H04N 21/2347; H04N 21/231; H04N 21/25875; H04N 21/44008;
(Continued)

(56) References Cited

U.S. PATENT DOCUMENTS

2018/0091495 A1 3/2018 Lu et al.
2018/0249200 A1 8/2018 Wang et al.

FOREIGN PATENT DOCUMENTS

CN 101650854 A 2/2010
CN 103247101 A 8/2013
(Continued)

OTHER PUBLICATIONS

The World Intellectual Property Organization (WIPO) International Search Report for PCT/CN2018/116853 dated Jan. 30, 2019 5 Pages (including translation).

*Primary Examiner* — Yassin Alata
(74) *Attorney, Agent, or Firm* — Anova Law Group, PLLC

(57) ABSTRACT

The present disclosure provides a media data processing method. The method includes obtaining, after determining that a user client performs a service operation with a first service client, first video data from the user client and second video data from the first service client; and synthesizing the first video data with the second video data to generate service operation video data. The method also includes transmitting the service operation video data to the user client and the first service client; obtaining a processing result of the service operation from the first service client; storing the service operation video data and generating storage information; receiving an access request that is transmitted by a second service client and that carries the storage information; and obtaining the service operation video data according to the storage information and returning the service operation video data to the second service client.

20 Claims, 14 Drawing Sheets

(51) Int. Cl.
*H04L 29/08* (2006.01)
*H04N 21/231* (2011.01)
*H04N 21/258* (2011.01)
*H04N 21/44* (2011.01)
*H04N 21/4402* (2011.01)
*H04N 21/4405* (2011.01)
*H04N 21/61* (2011.01)

(52) U.S. Cl.
CPC ..... *H04N 21/231* (2013.01); *H04N 21/25875* (2013.01); *H04N 21/4402* (2013.01); *H04N 21/4405* (2013.01); *H04N 21/44008* (2013.01); *H04N 21/6125* (2013.01); *H04N 21/6175* (2013.01)

(58) Field of Classification Search
CPC ........... H04N 21/4402; H04N 21/4405; H04N 21/6125; H04N 21/6175; H04L 63/08; H04L 67/1097
See application file for complete search history.

(56) References Cited

FOREIGN PATENT DOCUMENTS

| | | |
|---|---|---|
| CN | 105791692 A | 7/2016 |
| CN | 107995499 A | 5/2018 |
| WO | 2017020585 A1 | 2/2017 |

MEDIA DATA PROCESSING METHOD, COMPUTING DEVICE AND STORAGE MEDIUM

RELATED APPLICATIONS

This application is a continuation application of PCT Patent Application No. PCT/CN2018/116853, filed on Nov. 22, 2018, which claims priority to China Patent Application No. 201711258239.9, filed with the Chinese Patent Office on Dec. 4, 2017 and entitled "MEDIA DATA PROCESSING METHOD AND APPARATUS, AND RELATED DEVICE", content of all of which is incorporated herein by reference in its entirety.

FIELD OF THE TECHNOLOGY

This application relates to the field of information technologies and, in particular, to a media data processing method, a computing device, and a storage medium.

BACKGROUND OF THE DISCLOSURE

With the development of information technologies and the arrival of the information era, information brings great convenience to people's life as a major productivity factor, so that people can carry out various activities through the Internet without going out, for example, online shopping, online entertainment, online payment, or even online authentication. However, people may suffer from malicious attacks from the Internet during online activities. As a result, private information of people is leaked and stolen, causing threats to property safety of people. Especially, in online authentication activities and services having online authentication activities, security of private data often cannot be maintained comprehensively. Moreover, authentication modes of current online authentication activities often cannot meet high requirements of authentication activities yet.

The disclosed methods and systems are directed to solve one or more problems set forth above and other problems.

SUMMARY

One aspect of the present disclosure provides a media data processing method. The method includes: obtaining, after determining that a user client performs a service operation with a first service client, first video data from the user client and second video data from the first service client; and synthesizing the first video data with the second video data to generate service operation video data. The method also includes transmitting the service operation video data to the user client and the first service client, so that the first service client completes the service operation with the user client according to the service operation video data; obtaining a processing result of the service operation from the first service client; storing the service operation video data and generating storage information, in response to the processing result indicating that the operation takes effect; and receiving an access request that is transmitted by a second service client and that carries the storage information. The method further includes obtaining, in response to the access request, the service operation video data according to the storage information and returning the service operation video data to the second service client, so that the second service client completes processing for the service operation according to the service operation video data.

Another aspect of the present disclosure provides a computing device. The computing device includes a memory storing computer readable instructions; and a processor coupled to the memory. The processor executes the computer readable instructions in the memory to perform: obtaining, after determining that a user client performs a service operation with a first service client, first video data from the user client and second video data from the first service client; and synthesizing the first video data with the second video data to generate service operation video data; transmitting the service operation video data to the user client and the first service client, so that the first service client completes the service operation with the user client according to the service operation video data; obtaining a processing result of the service operation from the first service client; storing the service operation video data and generate storage information in response to the processing result indicating that the operation takes effect; receiving an access request that is transmitted by a second service client and that carries the storage information; and obtaining, in response to the access request, the service operation video data according to the storage information and return the service operation video data to the second service client, so that the second service client completes processing for the service operation according to the service operation video data.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present invention or in the prior art more clearly, the following briefly introduces the accompanying drawings required for describing the embodiments or the related technology. Apparently, the accompanying drawings in the following description merely show some embodiments of the present invention, and a person of ordinary skill in the art may still derive other drawings from these accompanying drawings without creative efforts.

DETAILED DESCRIPTION

The following more clearly and completely describes the technical solutions in the embodiments of the present disclosure with reference to the accompanying drawings. Apparently, the described embodiments are merely some rather than all of the embodiments of the present disclosure. Other embodiments obtained by a person of ordinary skill in the art based on the embodiments of the present disclosure without creative efforts shall fall within the protection scope of the present disclosure.

To make the description concise and intuitive, the following describes the solutions of the present disclosure by describing various embodiments. Numerous details in the embodiments are merely used to help understand the solutions of the present disclosure. However, the implementation of the technical solutions of the present disclosure is not limited to these details. To avoid unnecessarily obscuring the solutions of the present disclosure, some implementations are not described in detail, but only a framework is given. In the following description, "including" means "including, but not limited to," and "according to . . . " means "at least according to . . . , but the basis is not limited to . . . " When the number of elements is not specified in the following description, it means that there may be one or more elements, or it may be interpreted as at least one element.

To resolve the problem that a user may suffer from malicious attacks from the Internet during online activities, causing private information of the user to be leaked and stolen, especially the problem that in online authentication activities and services having online authentication activities, security of private data cannot be maintained comprehensively, and high requirements of authentication modes of current online authentication activities cannot be met, the present disclosure provides a media data processing method. The media data processing method is applied to various application scenarios, such as security account opening based on a two-way video, insurance underwriting based on a two-way video, bank secondary account opening based on a two-way video, and other to-be-verified or to-be-authenticated service operations.

Figure 1:
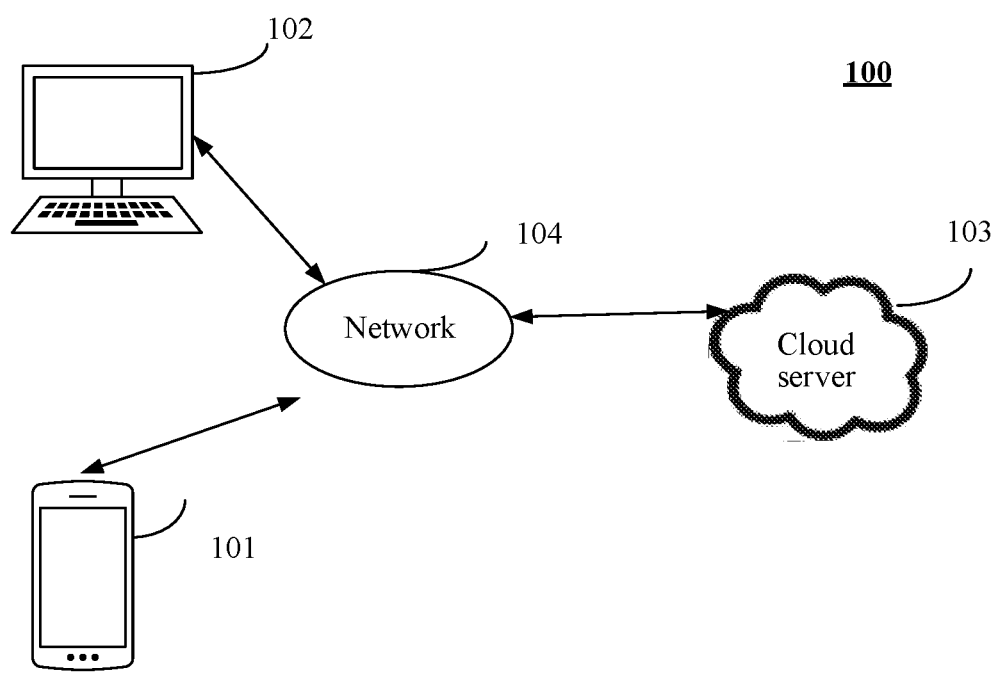
FIG. 1 is a schematic structural diagram of a system performing a processing method according to an embodiment of the present disclosure.

FIG. 1 is a schematic structural diagram of a system applying a media data processing method according to an embodiment of the present disclosure. The system 100 at least includes a terminal device 101, a terminal device 102, a cloud server 103, and a network 104. The cloud server is a simple, efficient, safe and reliable elastic compute service (ESC), and is a service platform that provides comprehensive service capabilities for various Internet users.

A user client (such as a social APP) running in the terminal device 101 may perform information interaction with a first service client (such as a web-version social application program) running in the terminal device 102 through the network 104. Moreover, the user client (such as a social APP) running in the terminal device 101 may exchange information with the cloud server 103 through the network 104.

The terminal device 101 refers to a terminal device having a data computing and processing function, and includes, but is not limited to, a smartphone (installed with a communications module), a palmtop computer, a tablet computer, and the like. The terminal devices are each installed with an operating system, which includes, but is not limited to: an Android operating system, a Symbian operating system, a Windows mobile operating system, an Apple iPhone OS operating system, and the like.

The first service client (such as a web-version social application program) or a second service client (such as a web-version social application program) running in the terminal device 102 may exchange information with the cloud server 103 through the network 104.

The terminal device 102 refers to a terminal device having a data computing and processing function, and includes, but is not limited to, a PC (installed with a communications module), and the like. The terminal devices are each installed with an operating system, which includes, but is not limited to: a Windows mobile operating system, a Linux operating system, an Apple OS operating system, and the like. The network 104 may be a wired network or a wireless network.

Application server software corresponding to a processing method for media data in the user client, the first service client, and the second service client may run in the cloud server 103.

Figure 2:
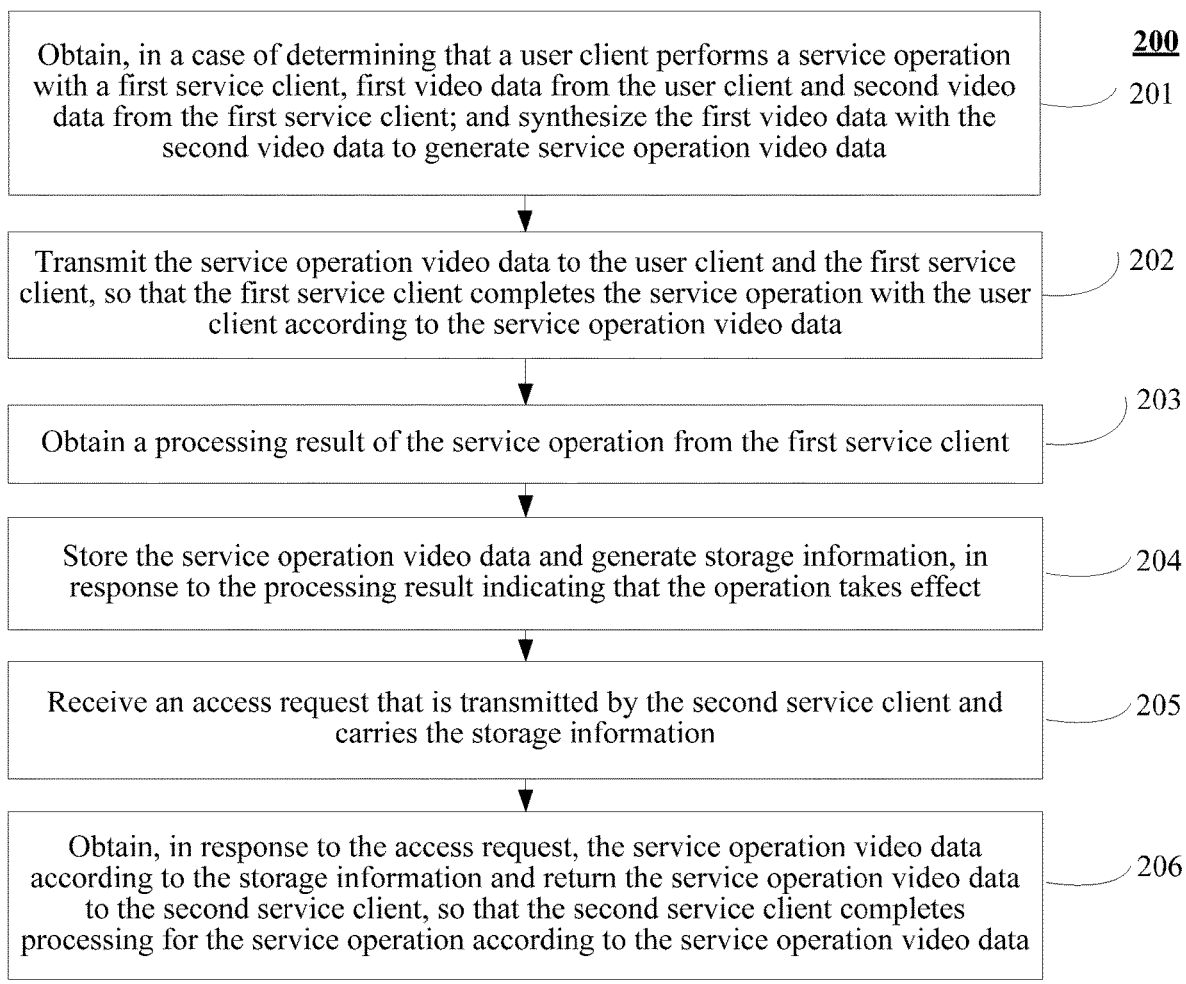
FIG. 2 is an interaction flowchart of a processing method according to an embodiment of the present disclosure.
Figure 3:
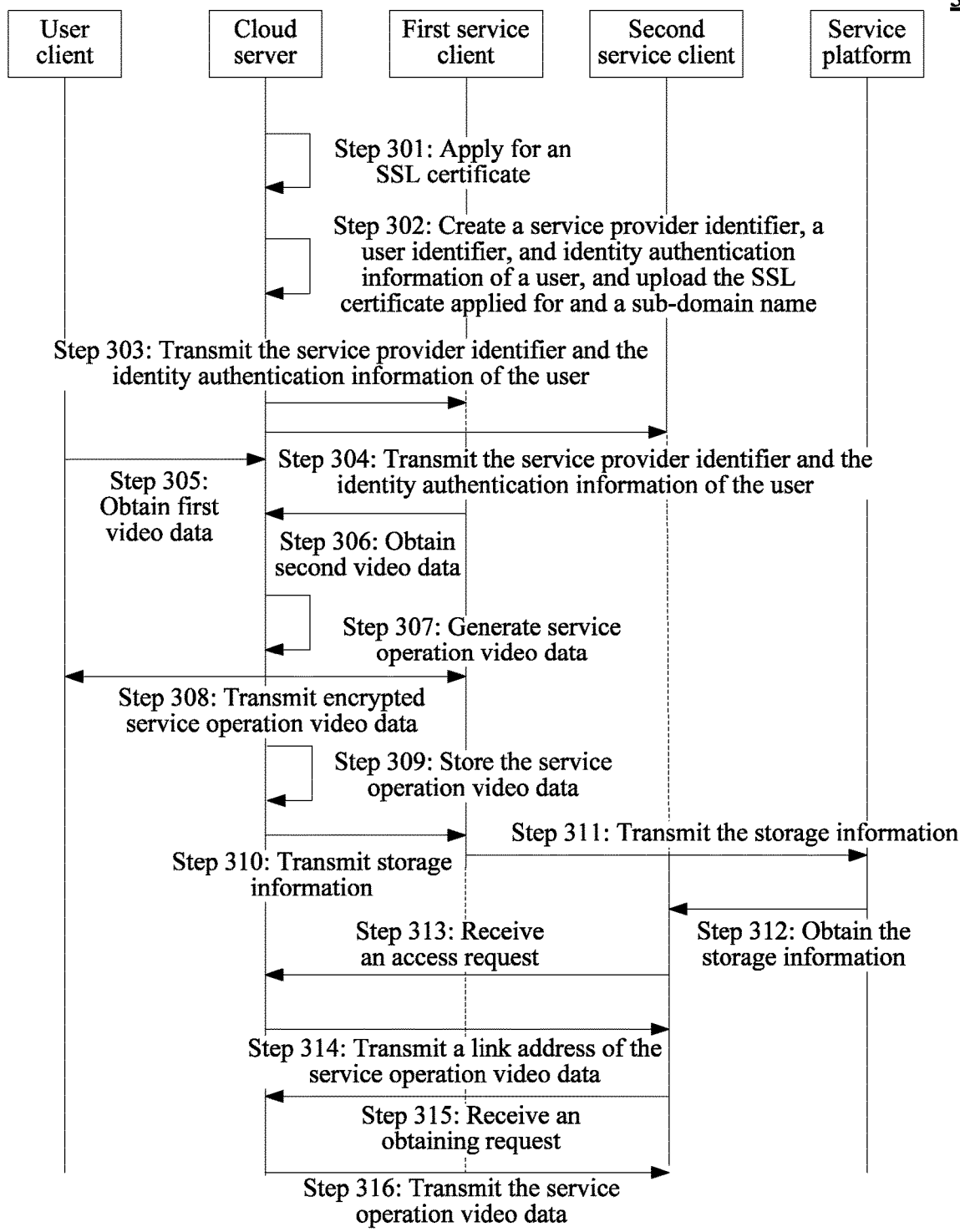
FIG. 3 is a flowchart of another processing method according to an embodiment of the present disclosure.

Based on the foregoing system 100, an embodiment of the present disclosure provides a media data processing method applied to the application server software in the cloud server 103. The cloud server 103 at least includes (not shown): a stream mixing server, an independent control server, and an object storage COS server. The method 200 is described in the following with reference to FIG. 2 and FIG. 3. As shown in FIG. 2, the method 200 includes the followings.

Step 201: After determining that a user client performs a service operation with a first service client, obtain first video data from the user client and second video data from the first service client; and synthesize the first video data with the second video data to generate service operation video data.

A method for determining that a user client performs a service operation with a first service client is as follows.

In some embodiments, the cloud server 103 (the object storage COS server) receives user authorization information (such as an Open ID and an authorization token of a user) transmitted by the user client (such as a social APP), obtains user login information (such as a social account nickname of the user, or avatar information of a social account of the user) of the user client according to the user authorization information, and transmits the user login information of the user client to the first service client (such as a web-version social application program). The cloud server 103 (the stream mixing server) determines, upon reception of the user login information of the user client transmitted by the first service client, that the user client performs a service operation (such as security account opening based on a two-way video) with the first service client.

A method for obtaining user login information of the user client according to the user authorization information is as follows. In some embodiments, the cloud server 103 (the object storage COS server) transmits, to an application server that the user client logs onto (such as a social application server that the social APP logs onto), a user login information obtaining request carrying the user authorization information. The cloud server 103 (the object storage COS server) receives the user login information that is returned by the application server in response to the obtaining request.

After obtaining the user login information of the user client, the cloud server 103 (the object storage COS server) transmits the login information to the first service client. The first service client determines a file name corresponding to a user of the user client according to the login information. The file name is a file name of final service operation video data. Before the cloud server 103 (the stream mixing server) generates the service operation video data, the first service client transmits the user login information and the file name to the cloud server 103 (the stream mixing server), so that the cloud server 103 (the stream mixing server) searches for and stores the user login information and the file name subsequently. The user of the user client may be a to-be-authenticated user (such as a user of a social APP), and a user of the first service client may be a user who authenticates the to-be-authenticated user (for example, an agent of a service provider).

In some embodiments, the cloud server 103 (the stream mixing server) receives a video connection request (where the video connection request carries a user identifier of the user client, such as a user ID) transmitted by the user client (such as a social APP). The cloud server 103 (the stream mixing server) obtains the user identifier of the user client by parsing the video connection request. The cloud server 103 (the stream mixing server) determines a corresponding first service client according to the user identifier of the user client in response to the video connection request, and establishes a video connection between the user client and the first service client. After establishing the video connection, the cloud server 103 (the stream mixing server) performs, through the video connection, Step 305 of obtaining first video data (that is, local video data of the user of the user client) and Step 306 of obtaining second video data (that is, local video data of the user of the first service client), and further performs Step 307 of generating service operation video data.

The local video data of the user of the user client is obtained through a camera device (such as a front camera) disposed in the terminal device 101, and is transmitted to the cloud server 103 (the stream mixing server) through the user client. The local video data of the user of the first service client is obtained through a camera device (such as a front camera) disposed in the terminal device 102, and is transmitted to the cloud server 103 (the stream mixing server) through the first service client.

In addition, the user ID may be a user account nickname, or the like. During establishment of the video connection between the user client and the first service client, because the first service client has transmitted the user login information of the user client to the cloud server 103 (the stream mixing server), the cloud server 103 (the stream mixing server) can establish the video connection between the user client and the first service client.

In some embodiments, Step 201 of obtaining first video data from the user client and second video data from the first service client; and synthesizing the first video data with the second video data to generate service operation video data includes: The cloud server 103 (the stream mixing server) obtains, through a first secure transmission channel (such as an HTTPS secure channel), a first encrypted video data stream transmitted by the user client; the cloud server 103 (the stream mixing server) obtains, through a second secure transmission channel (such as an HTTPS secure channel), a second encrypted video data stream transmitted by the first service client; the cloud server 103 (the stream mixing server) decrypts the obtained first encrypted video data stream to obtain a decrypted first video data stream; the cloud server 103 (the stream mixing server) decrypts the second encrypted video data stream to obtain a decrypted second video data stream, and mixes the decrypted first video data stream with the decrypted second video data stream (for example, two video data streams are mixed) to generate a service operation video data stream.

The encryption format for the first encrypted video data stream and the second encrypted video data stream at least includes symmetric encryption, such as a Data Encryption Standard (DES) and an Advanced Encryption Standard (AES).

In addition, before the HTTPS secure channel is established, the cloud server 103 (the independent control server) needs to initiate Step 301 with a digital certificate authority: Applying for an SSL certificate, that is, an HTTPS certificate. The cloud server 103 (the independent control server) performs Step 302: Uploading the SSL and a sub-domain name to the cloud server 103 (the object storage COS server). In addition, the cloud server 103 transmits the obtained SSL certificate to the cloud server 103 (the mixing server) through the first service client. After the cloud server 103 (the mixing server) finishes uploading the SSL certificate, the first encrypted video data stream can be transmitted through the established HTTPS secure channel.

In some embodiments, upon detecting that the first encrypted video data stream transmitted by the user client arrives (that is, the first encrypted video data stream arrives at a cloud public area of the cloud server 105), the cloud server 103 performs data stream detection on the first encrypted video data stream; after the first encrypted video data stream passes the data stream detection, the cloud server 103 obtains a first encrypted video data stream transmitted by the user client.

Figure 4:
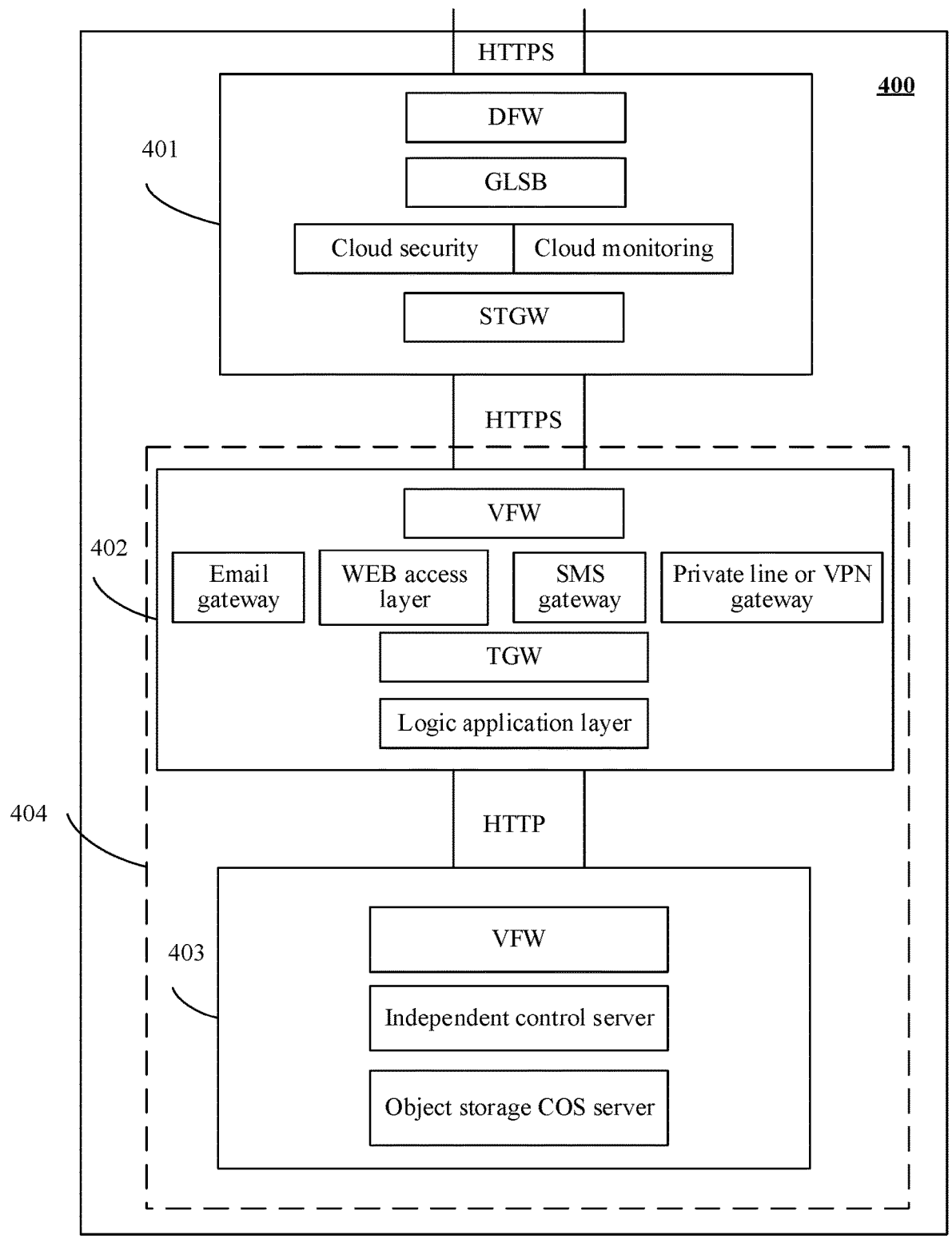
FIG. 4 is a flowchart of another processing method according to an embodiment of the present disclosure.

FIG. 4 is a schematic structural diagram 400 of the cloud server 103. The cloud server 103 includes a cloud public area 401, an isolated-region private cloud DMZ VPC private area 402, and a physically isolated independent-control private cloud VPC private area 403 in sequence from the outside to the inside. The cloud public area 401 is shared by cloud tenants. A distributed hardware firewall (DFW), a Global Server Load Balance (GSLB) device (responsible for traffic allocation between servers in different regions), cloud security (responsible for defending against DDOS attacks, WAF attacks, CC attacks, and the like), cloud monitoring (responsible for monitoring and management of the public area), a Security Tencent GateWay (STGW) device (a system responsible for supporting a 7-layer network HTTPS protocol to implement multi-network uniform access, forwarding a network request of an external network, and supporting automatic load balance) are disposed in the cloud public area 401 in sequence from the outside to the inside. When the first encrypted video data stream transmitted by the user client (such as a social APP) through the HTTPS protocol (or the HTTPS secure channel) arrives at the cloud public area 401, the first encrypted video data stream passes through the distributed hardware firewall DFW disposed in the cloud public area 401.

Detection is performed on the first encrypted video data stream by using a defense mechanism in the distributed hardware firewall DFW. The defense mechanism may include: a filtering mechanism, a network access control mechanism, an application access control mechanism, and the like. The first encrypted video data stream may be filtered based on data source information by using the filtering mechanism and the application access control mechanism, to control access requests in the network. In addition, the network access control mechanism may be used for controlling an access request transmitted by a device (such as a terminal of a cloud tenant) in the cloud server 103 to a target device (such as a target server or a target terminal) in the network.

The distributed hardware firewall DFW not only can implement functions of a conventional perimeter firewall (for example, defending against attacks from an external network), but also can defend against attacks from an internal network in the cloud server 103, thus improving the security performance of the whole cloud server 103. After the first encrypted video data stream passes through the distributed hardware firewall DFW, a stream mixing server is selected through the Global Server Load Balance (GSLB) device. The stream mixing server has good availability performance currently, where the availability performance is determined according to data such as CPU usage and bandwidth usage. In addition, a link condition between the first encrypted video data stream and the stream mixing server is also good, thus ensuring the access quality. Moreover, the cloud security (responsible for defending against DDOS attacks, WAF attacks, CC attacks, and the like) and cloud monitoring (responsible for monitoring and management of the public area) may further detect and monitor access requests (such as the first encrypted video data stream) in the network, to prevent harm to the security of the cloud server.

The cloud public area 401 implements network isolation for cloud tenants by dividing a virtual routing and forwarding table VRF area, to form a VRF isolated region 404. Only a request packet of a request transmitted by a client (such as a user client) that currently transmits authorization information to the cloud server 103 and completes authorized login can be transmitted to the isolated-region private cloud DMZ VPC private area 402 through an HTTPS protocol (or an HTTPS secure channel).

When the first service client (such as a web-version social application program) transmits the second encrypted video data stream, the second encrypted video data stream is also transmitted to the cloud public area 401 through an HTTPS protocol (or an HTTPS secure channel). Moreover, a method for performing detection on the second encrypted video data stream by the cloud public area 401 is the same as the foregoing method for performing detection on the first encrypted video data stream.

The isolated-region private cloud DMZ VPC private area 402 is a private area for external services, and is provided with a virtual firewall VFW, a network WEB access layer, a private line channel or a VPN channel gateway, a gateway TGW device, and a logic application layer in sequence from the outside to the inside. The isolated-region private cloud DMZ VPC private area 402 is further provided with an email gateway and an SMS gateway of an alarm channel, so as to give an alarm. A stream mixing server is deployed in the logic application layer of the isolated-region private cloud DMZ VPC private area 402. The stream mixing server is responsible for performing step 201 of the cloud server 103. The stream mixing server is accessed through the network WEB access layer. The user client or the first service client transmits a request or data to the network WEB access layer through an HTTPS protocol (or an HTTPS secure channel), thus accessing the stream mixing server.

The virtual firewall VFW is disposed according to a virtual network security policy (such as an access control right policy or a filtering policy), so as to be used by different tenants, thus ensuring network security in the isolated-region private cloud DMZ VPC private area 402 while reducing costs of network security.

In addition, the first service client may directly access the cloud server 103 (the independent control server or the object storage COS server) through a private line or a VPN. The first service client forwards an access request or access data to the independent control server or the object storage COS server in the physically isolated independent-control private cloud VPC private area 403 through the private line channel or the VPN channel gateway.

After the first encrypted video data stream or the second encrypted video data stream passes the data stream detection of the defense mechanisms disposed in the cloud public area 401 and the isolated-region private cloud DMZ VPC private area 402, the stream mixing server receives the first encrypted video data stream through the network WEB access layer.

A virtual firewall VFW based on a virtual network security policy, an independent control server (that is, an independent control system), and an object storage COS server (that is, an object storage COS system) are disposed in the physically isolated independent-control private cloud VPC private area 403 in sequence from the outside to the inside. The physically isolated independent-control private cloud VPC private area 403 is a standard integrated physically isolated area, and provides an independent control server, so as to be independently operated and maintained by a service provider. To enter the physically isolated area (such as an equipment room), a user needs to be authorized by the service provider and accompanied by service provider personnel with a private entrance guard card. When a user enters the physically isolated area without authorization of the service provider or without being accompanied by service provider personnel with a private entrance guard card, the physically isolated area may give an alarm to the service provider personnel in a form of an email or an SMS message through an email gateway or an SMS gateway of an alarm channel further disposed in the isolated-region private cloud DMZ VPC private area 403, so that the related personnel is informed in time and the alarm event is processed, thus ensuring the security of the physically isolated area.

The first service client transmits an access request or access data to the private line channel or the VPN channel gateway through a private line channel or a VPN channel. Then, the private line channel or the VPN channel gateway transmits the access request or the access data to the independent control server or the object storage COS server. The object storage COS server is deployed, operated, and maintained by the independent control server, and only provides HTTP access to the logic application layer of the isolated-region private cloud DMZ VPC private area 402 of the service provider. When the first service client transmits an access request or access data to the independent control server or the object storage COS server in the physically isolated independent-control private cloud VPC private area 403 through the private line channel or the VPN channel gateway, network security of public tenants in the cloud server 103 can be effectively ensured by setting a multi-protection mechanism for the cloud server 103.

Step 202: Transmit the service operation video data to the user client and the first service client, so that the first service client completes the service operation with the user client according to the service operation video data.

In some embodiments, the transmitting the service operation video data to the user client and the first service client includes: The cloud server 103 (the stream mixing server) encrypts the service operation video data stream, performs, through the first secure transmission channel (the HTTPS secure channel), Step 308 of transmitting the encrypted service operation video data stream to the user client, and performs, through the second secure transmission channel (the HTTPS secure channel), Step 308 of transmitting the encrypted service operation video data stream to the first service client, so that the user client or the first service client decrypts the encrypted service operation video data and displays the service operation video data to respective users.

Step 203: Obtain a processing result of the service operation from the first service client.

In some embodiments, after the user client and the first service client finish the video connection (that is, when a two-way video authentication processing operation is completed), the cloud server 103 (the stream mixing server) transmits an obtaining request for a processing result to the first service client at a fixed time. The first service client transmits the processing result to the cloud server 103 (the stream mixing server) in response to the obtaining request. The processing result includes that the operation takes effect (for example, the authentication processing succeeds) or the operation does not take effect (for example, the authentication processing fails).

Step 204: Store the service operation video data and generate storage information, in response to the processing result indicating that the operation takes effect.

Before storing the service operation video data, the cloud server 103 (the stream mixing server) obtains user information from the first service client. The user information of the first service client includes a service provider identifier (such as a service provider ID) of a service provider to which the first service client belongs and identity authentication information (such as an access token or an access certificate token) of a user of the first service client. The identity authentication information of the user corresponds to the user identifier in a one-to-one manner.

In some embodiments, the cloud server 103 (the independent control server) performs Step 302: Uploading the SSL certificate applied for and the created sub-domain name of the object storage COS server to the cloud server 103 (the object storage COS server). The cloud server 103 (the independent control server in the object storage COS server) performs Step 302 for the service provider: Creating a service provider identifier (such as a service provider ID), a user identifier (such as a user ID) of the first service client, and identity authentication information of a user of the first service client. After finishing creating the service provider identifier (such as a service provider ID), the user identifier (such as a user ID) of the first service client, and the identity authentication information of the user of the first service client, the cloud server 103 (the object storage COS server) transmits the service provider identifier (such as a service provider ID), the user identifier (such as a user ID) of the first service client, and the identity authentication information of the user of the first service client to the cloud server 103 (the independent control server).

In some embodiments, the cloud server 103 (the object storage COS server) receives user authorization information (such as an Open ID and an authorization token of the user) transmitted by the first service client. The cloud server 103 (the object storage COS server) transmits, to an application server that the first service client logs onto (for example, a social application server that a web-version social application program logs onto), a user login information obtaining request carrying the user authorization information. The cloud server 103 (the object storage COS server) receives user login information that is returned by the application server in response to the obtaining request, thus completing authorized login of the user of the first service client. When the cloud server 103 (the object storage COS server) obtains the user login information (such as a social account nickname of the user and avatar information of a social account of the user) of the first service client, that is, when authorized login of the user of the first service client is completed, the cloud server 103 (the independent control server) performs Step 303: Transmitting the service provider identifier and the identity authentication information of the user of the first service client to the first service client. After the cloud server 103 (object storage COS server) transmits the service provider identifier and the identity authentication information of the user of the first service client to the first service client, the step of obtaining, by the cloud server 103 (the stream mixing server), user information from the first service client before the service operation video data is stored is performed.

The first service client may further obtain the sub-domain name of the object storage COS server from the independent control server, to determine an access address of the object storage COS server.

The cloud server 103 (the stream mixing server) transmits a storage request to the cloud server 103 (the object storage COS server). When the cloud server 103 (the object storage COS server) receives the storage request of the service operation video data, where the storage request carries the user information of the first service client, the user information of the first service client is verified. After the user information of the first service client passes the verification, the cloud server 103 (the object storage COS server therein) performs step 309: Store the service operation video data, and determine storage information of the service operation video data.

In some embodiments, the storing the service operation video data includes: The cloud server 103 (the object storage COS server) stores the service operation video data as a video file, divides the video file into at least two video data segments, generates corresponding video data segment index information according to the video data segments, stores the video data segments on at least two storage nodes (such as storage servers) in a distributed manner, stores the video data segment index information, and determines storage information (such as a storage address) of the video data segment index information. Because the video data segments are stored in a distributed manner in this embodiment, it is impossible to obtain useful complete video data by stealing any magnetic disk medium, thus ensuring the security of data storage.

The video data segment index information at least includes a video file ID, video file description information, a video data segment identifier, as well as a start time, an end time, an offset, and a data length of each video data segment in the video file, and the like.

In some embodiments, the cloud server 103 (the object storage COS server) performs Step 310: Transmitting the storage information (such as a storage address) of the service operation video data to the first service client, so that the first service client performs Step 311: Storing the storage information in a service platform, to be obtained by the second service client.

A user of the second service client may be a user who reviews the service operation video data, for example, a reviewer of the service provider.

Step 205: Receive an access request that is transmitted by the second service client and carries the storage information.

In some embodiments, the second service client performs step 312: Obtain the storage information (such as a storage address) from the service platform. The second service client transmits an access request to the cloud server 103 (the object storage COS server), and the access request carries the storage information. The cloud server 103 (the object storage COS server) performs Step 313: Receiving the access request.

When the second service client obtains the storage information from the service platform, the user of the second service client needs to have a viewing right and an obtaining right to obtain the storage information. The user of the first service client may have the right to view and obtain storage information recorded by the user of the first service client into the service platform.

Step 206: Obtain, in response to the access request, the service operation video data according to the storage information and return the service operation video data to the second service client, so that the second service client completes processing for the service operation according to the service operation video data.

In some embodiments, the access request further carries user information of the second service client. The cloud server 103 (the object storage COS server) verifies the user information of the second service client in response to the access request. After the user information of the second service client passes the verification, the cloud server 103 (the object storage COS server) obtains the service operation video data according to the storage information (such as a storage address), and perform Step 316: Transmitting the service operation video data to the second service client.

The user information of the second service client includes a service provider identifier (such as a service provider ID) of a service provider to which the second service client belongs and identity authentication information (such as an access token or an access certificate token) of a user of the second service client.

In addition, the service operation video data is stored in an encrypted manner. Therefore, when the stored service operation video data is transmitted to the second service client, the service operation video data is also encrypted. After receiving the encrypted service operation video data, the second service client decrypts the service operation video data and displays the decrypted service operation video data to the user of the second service client for reviewing.

In some embodiments, the cloud server 103 (the independent control server in the object storage COS server) performs Step 302 for the service provider: Creating a user identifier (such as a user ID) of the second service client and identity authentication information of a user of the second service client. After finishing creating the user identifier (such as a user ID) of the second service client and the identity authentication information of the user of the second service client, the cloud server 103 (the object storage COS server) performs Step 304: Transmitting the user identifier (such as a user ID) of the second service client and the identity authentication information of the user of the second service client to the cloud server 103 (the independent control server).

Because the SSL certificated applied for and the created sub-domain name of the object storage COS server are already uploaded to the cloud server 103 (the object storage COS server) in the foregoing, the step is not repeated herein. Moreover, because the service provider identifier is already created in the foregoing, the service provider identifier is not created again herein.

In some embodiments, the cloud server 103 (the object storage COS server) receives user authorization information (such as an Open ID and an authorization token of the user) transmitted by the second service client. The cloud server 103 (the object storage COS server) transmits, to an application server that the second service client logs onto (for example, a social application server that a web-version social application program logs onto), a user login information obtaining request carrying the user authorization information. The cloud server 103 (the object storage COS server) receives user login information that is returned by the application server in response to the obtaining request, thus completing authorized login of the user of the second service client. When the cloud server 103 (the object storage COS server) obtains the user login information (such as a social account nickname of the user and avatar information of a social account of the user) of the second service client, the cloud server 103 (the independent control server) performs Step 304: Transmitting the service provider identifier and the identity authentication information of the user of the second service client to the second service client. After the cloud server 103 (the independent control server) transmits the service provider identifier and the identity authentication information of the user of the second service client to the second service client, the cloud server 103 (the object storage COS server) performs the step of receiving an access request that is transmitted by the second service client and carries the storage information.

The second service client may further obtain the sub-domain name of the object storage COS server from the independent control server to determine an access address of the object storage COS server. In addition, when directly accessing the object storage COS server to process the service operation video data, the stream mixing server, the first service client, and the second service client all need to carry the sub-domain name of the object storage COS server, to determine the access address of the object storage COS server.

In some embodiments, the obtaining the service operation video data according to the storage information and returning the service operation video data to the second service client includes: The cloud server 103 (the object storage COS server) obtains the video data segment index information according to the storage information, aggregates the video data segments according to the video data segment index information to generate the service operation video data, and generates a link address of the service operation video data (such as an URL of the service operation video data) according to the generated service operation video data. The cloud server 103 (the object storage COS server) performs Step 314: Transmitting the link address to the second service client, so that the second service client performs step 315 according to the link address: Transmit an obtaining request to the cloud server 103 (the object storage COS server). The cloud server 103 (the object storage COS server) performs Step 316 in response to the obtaining request: Transmitting the service operation video data. Then, the second service client obtains the service operation video data.

In some embodiments, the aggregating the video data segments according to the video data segment index information to generate the service operation video data includes: The cloud server 103 (the object storage COS server) obtains IDs of the video data segments according to the video data segment index information, sorting the video data segment IDs according to a playing time sequence to generate a sorted table (that is, generated records), and sequentially determines storage locations of the video data segments according to the sorted table, thus completing the whole service operation video data and a connection address of the service operation video data.

In some embodiments, after the cloud server 103 (the object storage COS server) obtains the service operation video data according to the storage information and returns the service operation video data to the second service client, the records (that is, the sorted table) generated according to the video data segments and the generated link address are deleted, thus effectively ensuring the security of data storage.

In some embodiments, at the end of a life cycle of the service operation video data (or at the end of a life cycle of application software running in the object storage COS server), the records (that is, the sorted table) generated according to the video data segments and the generated link address are deleted, thus effectively ensuring the security of data storage.

In the present disclosure, a closed loop from the user client to the first service client can be implemented based on a social platform (such as a web-version social application program of a social APP), bringing perfect experience to the user. Moreover, the independent control server is deployed in the cloud server 103, so that one-key deployment with a high integration level is implemented. Costs invested on one-time setup of the service provider can be reduced, and the capacity can be expanded or reduced dynamically according to the development of the service operation. Operating costs can be effectively reduced through the independent control server.

Any physical medium in the cloud server 103 will be degaussed when leaving an area (such as an equipment room) where the independent control server is located, thus ensuring the data security.

Figure 5:
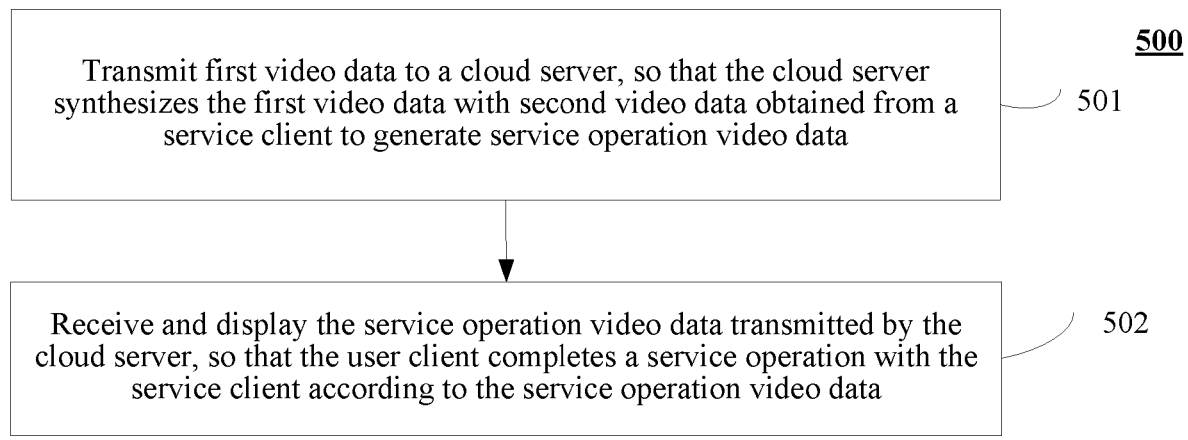
FIG. 5 is a flowchart of a media data processing method for a cloud server according to an embodiment of the present disclosure.

The present disclosure further provides a media data processing method applied to a user client (such as a social APP). As shown in FIG. 5, the method 500 includes the followings.

Step 501: Transmit first video data to a cloud server 103, so that the cloud server synthesizes the first video data with second video data obtained from a service client to generate service operation video data.

Figure 6:
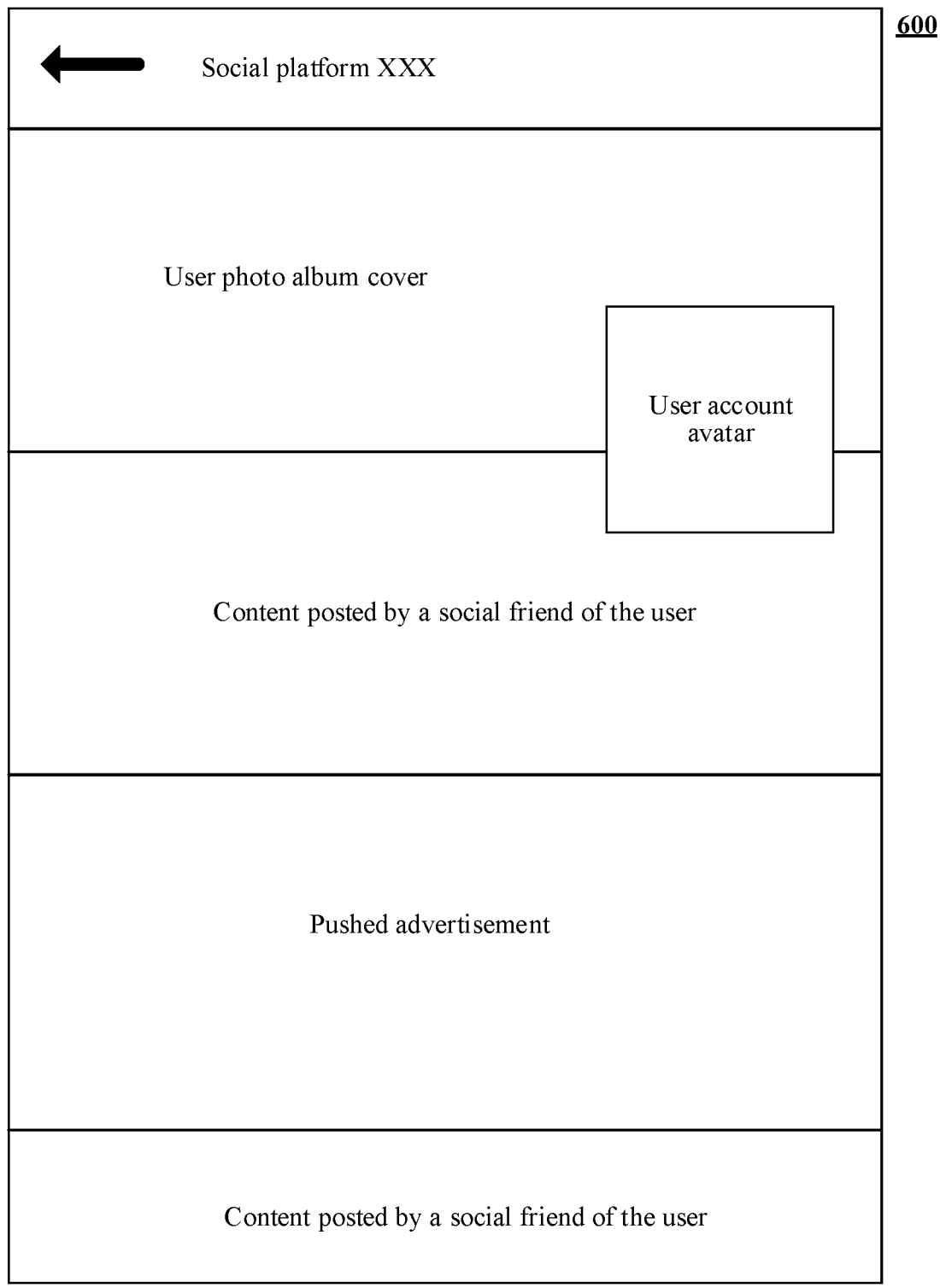
FIG. 6 is an embodiment of pushing advertisement in a social platform in an embodiment of the present disclosure.

In some embodiments, a service provider may push a push entrance (for example, an advertisement message, advertisement trends, or a service provider official account pushed in an application platform of a social APP) of a service operation to a user client of a customer according to customer information database of the service provider. FIG. 6 shows a push interface 600 for displaying advertisement in the user client. After seeing the push entrance (that is, the pushed advertisement) through the user client, the user may click the push entrance to complete authorized login to the push entrance. After the authorized login is completed, the user client invokes an H5 embedded application, a WeChat applet, or an official account, to enter the service operation application scenario (for example, security account opening based on a two-way video). The user completes service operations one by one according to prompt information in the service operation application scenario.

In some embodiments, the user performs two-way video authentication according to prompt information of the service operation. The prompt information displays, for the user client, a service operation entrance (such as a two-way video authentication interface) provided by the platform of the service provider. When the user clicks the service operation interface, the user client transmits a service operation request (such as a video connection request) to the service client (for example, a service client used when an agent of the service provider logs in) in response to a selection operation on the service operation entrance (that is, an operation of establishing a video connection to the service client). The service operation request carries the user login information of the user client.

Figure 7:
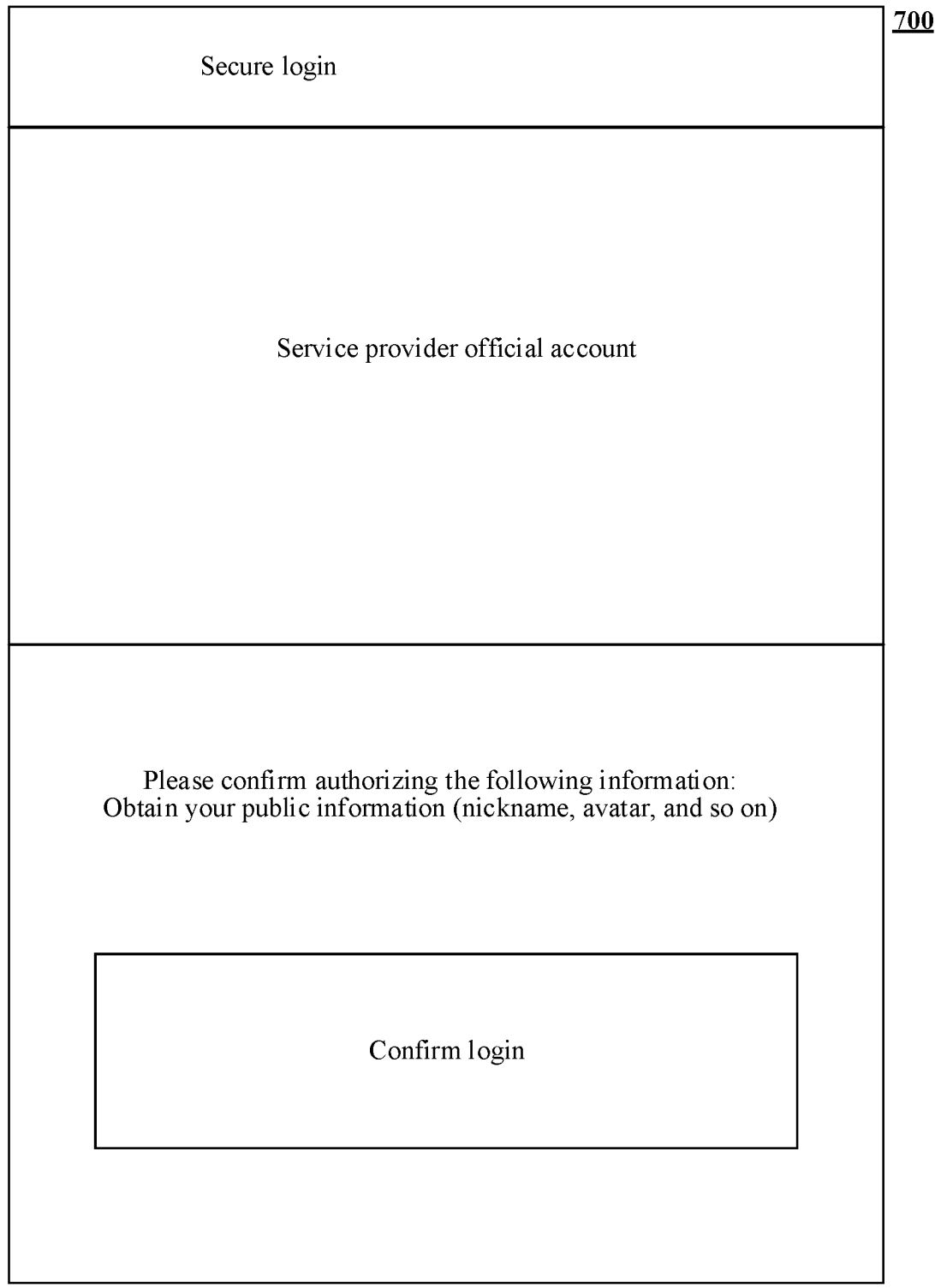
FIG. 7 is an embodiment of login authorization in a social platform in an embodiment of the present disclosure.
Figure 8:
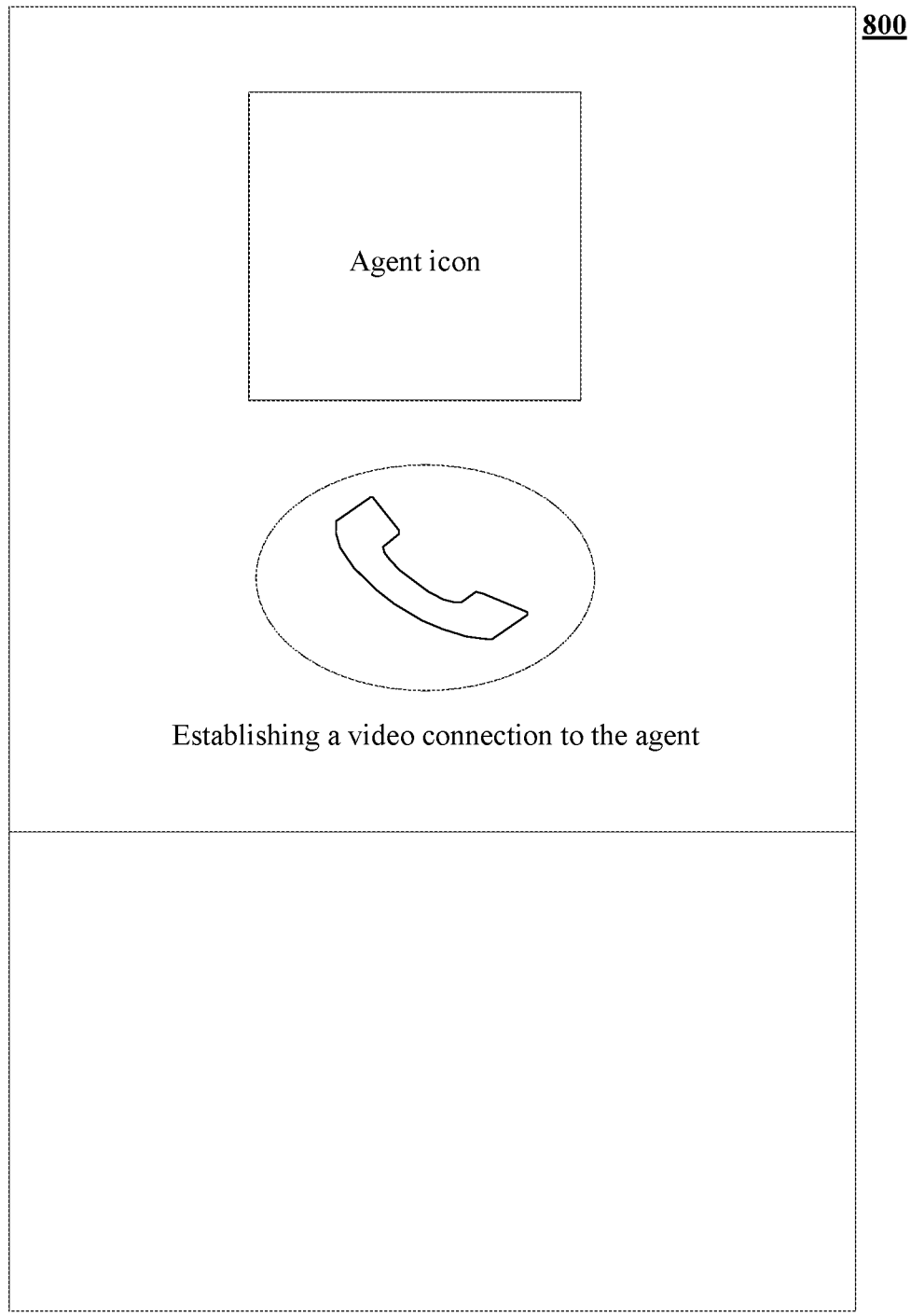
FIG. 8 is an embodiment of a user client establishing a video connection to a first service client in an embodiment of the present disclosure.

The authorized login may include the following manner: when the user clicks the push entrance, the user client displays, to the user through a service system SDK, that the user login information is authorized to the service provider, and confirms login. FIG. 7 shows an authorized login interface 700 displayed in the user client. When the user clicks "confirm login" in the login interface 700, the service system SDK of the user client transmits authorization information to the cloud server 103 (the object storage COS server) in response to a received login authorization instruction, so that the cloud server 103 (the object storage COS server) obtains, according to the authorization information, the user login information of the user client from an application server that the user client logs onto. After the authorized login is completed, the user client performs the step of transmitting the service operation request to the service client. FIG. 8 shows a video connection interface 800 in which the user client transmits a service operation request to the service client.

In some embodiments, the user client receives a video uploading instruction that is transmitted by the service client in response to the service operation request. The video uploading instruction carries address information of the cloud server 103 (the stream mixing server). When receiving the video uploading instruction, the user client performs, according to the address information, the step of transmitting the first video data to the cloud server 103 (the stream mixing server).

The first video data may be transmitted in the following manner: A two-way video SDK of the user client is invoked upon reception of the video uploading instruction; the two-way video SDK establishes an HTTPS secure channel, acquires a local user image through an image acquisition device (such as a front camera) of the terminal device 101, encrypts the acquired local user image, and uploads the encrypted local user image to the cloud server 103 (the stream mixing server).

The user may select an image encryption manner, and the image encryption manner may be the same as the encryption manner described above.

Step 502: Receive and display the service operation video data transmitted by the cloud server 103, so that the user client completes a service operation with the service client according to the service operation video data.

Figure 9:
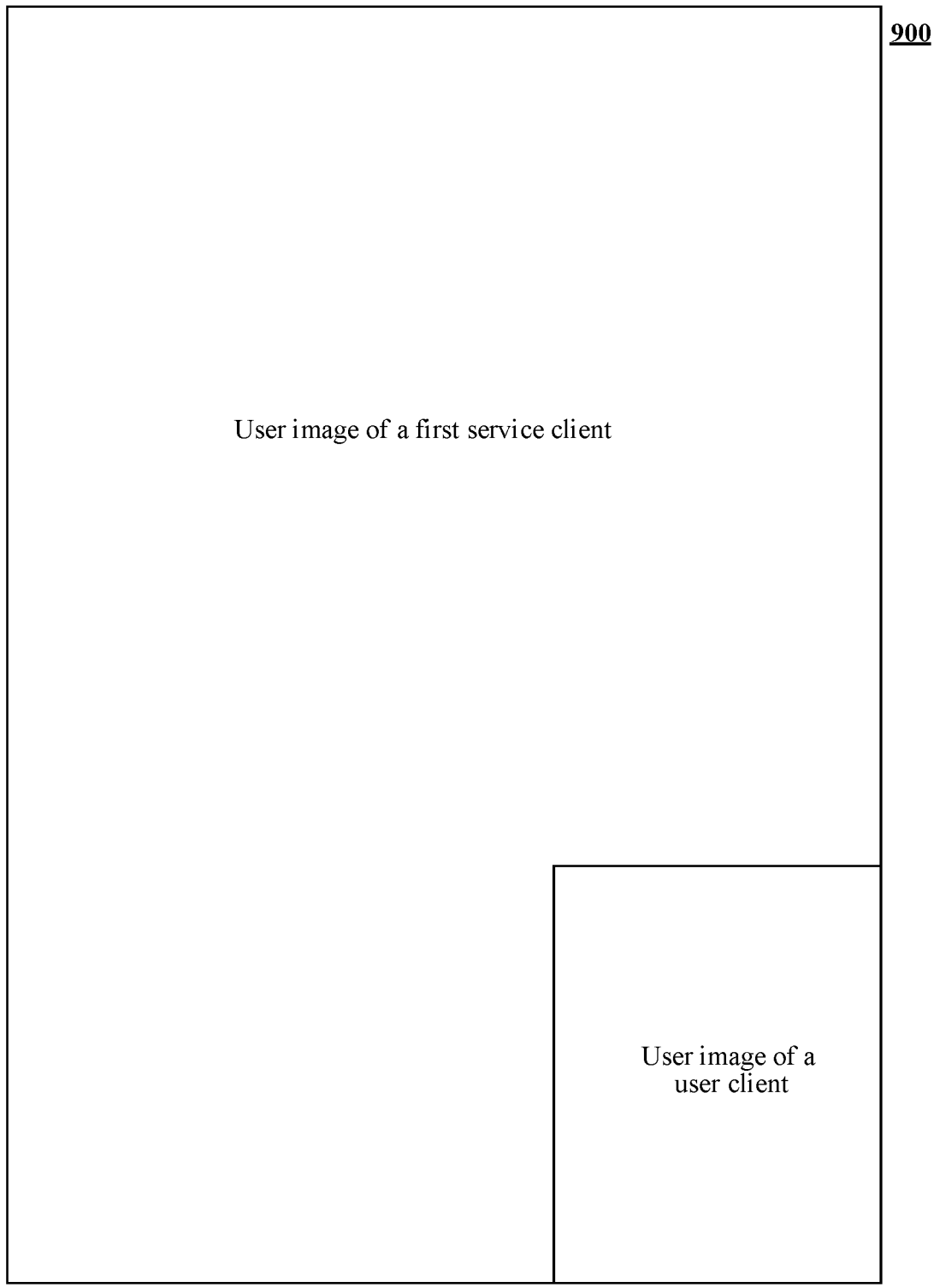
FIG. 9 is an embodiment of a user client performing video interaction with a first service client in an embodiment of the present disclosure.

In some embodiments, the two-way video SDK of the user client receives encrypted service operation video data that is transmitted by the cloud server 103 (the stream mixing server) through the HTTPS secure channel, decrypts the encrypted service operation video data, and displays the decrypted service operation video data to the user through a video window of the user client, so that the to-be-authenticated user performs a video interaction with a user of the service client. FIG. 9 shows a video window 900 for video interaction between the user client and the service client (for example, a service client used when an agent of the service provider logs in). The video window 900 displays the user of the user client (such as a user of a social APP) and the user of the service client (such as an agent of the service provider).

In addition, the two-way video SDK sets the decrypted service operation video data to be in a user private read/write mode.

In some embodiments, after the user of the user client completes two-way video authentication with the user of the service client, the user client transmits an obtaining request to the service client at a fixed time and receives a processing result of the service operation (for example, the authentication processing succeeds or the authentication processing fails) which is transmitted by the service client in response to the obtaining request.

Figure 10:
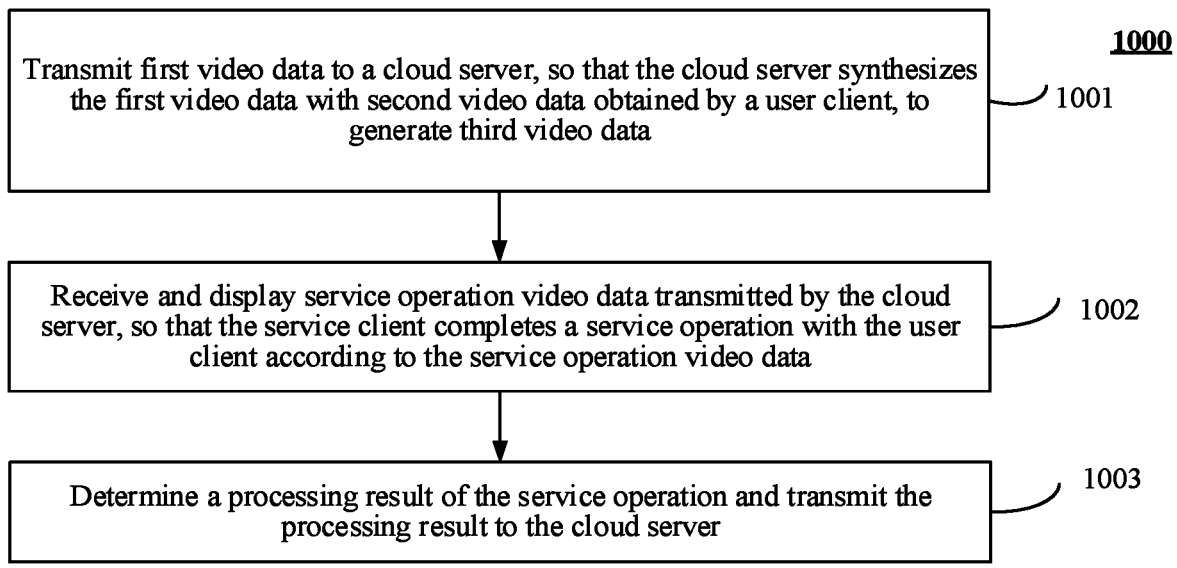
FIG. 10 is a flowchart of a service operation process in an embodiment of the present disclosure.

The present disclosure further provides a media data processing method applied to a service client (such as a web-version social application program). The method includes performing a service operation process during login of a first user (for example, an agent of a service provider). As shown in FIG. 10, the service operation process 1000 includes the followings.

Step 1001: Transmit first video data to a cloud server 103, so that the cloud server 103 synthesizes the first video data with second video data obtained from a service client to generate service operation video data.

In some embodiments, the service client (such as a web-version social application program) receives a service operation request transmitted by a user client (such as a social APP), where the service operation request carries user login information of the user client. The service client transmits a video uploading instruction to the user client in response to the service operation request. At the same time, the service client transmits a video connection request to the cloud server 103 (the stream mixing server), so that the cloud server 103 (the stream mixing server) establishes a video connection between the user client and the service client.

Because a user of the user client is already a customer of a service provider and the service provider has setup a customer information database for the user of the user client, based on the customer information database, a preset connection is established between the user in the customer information database and the user of the user client, so that a user of the service client can directly perform information interaction with the user client without relay of another server.

Step 1002: Receive and display the service operation video data transmitted by the cloud server 103, so that the service client completes a service operation with the user client according to the service operation video data.

In some embodiments, the service client transmits authorization information to the cloud server 103 (the object storage COS server) in response to the login authorization instruction, so that the cloud server 103 (object storage COS server) obtains, according to the authorization information, user login information of the service client from an application server that the service client logs onto (for example, an application server that a web-version social application program logs onto). After authorized login is completed, the service client transmits an obtaining request for user information of the service client to the cloud server 103 (the independent control server), and receives the user information of the service client that is returned by the cloud server 103 (the independent control server) in response to the obtaining request.

The user information of the service client includes: a service provider identifier of the service provider and identity authentication information of a user of the service client (that is, a first user or a second user, where the second user may be a reviewer of the service provider).

Although the service client is a web-version social application program, a specific processing manner for authorized login to the service client is the same as the specific processing manner for authorized login to the user client. In addition, a specific process of obtaining the user information of the service client has also been illustrated above, and details are not described herein again.

Step 1003: Determine a processing result of the service operation and transmit the processing result to the cloud server 103.

In some embodiments, after completing the service operation (for example, a service operation of two-way video authentication), the first user of the service client (such as an agent of the service provider) authenticates the service operation, and determines a processing result of the service operation (for example, the authentication processing succeeds or the authentication processing fails). At the same time, the first user stores the processing result (for example, the first user uploads the processing result to a service platform). After the service client receives a processing result obtaining request transmitted by the cloud server 103 (the stream mixing server), the service client transmits the processing result to the cloud server 103 (the stream mixing server) in response to the obtaining request.

In some embodiments, the service client receives storage information of the service operation video data which is transmitted by the cloud server 103 (the stream mixing server), and stores the storage information into the service platform.

Figure 11:
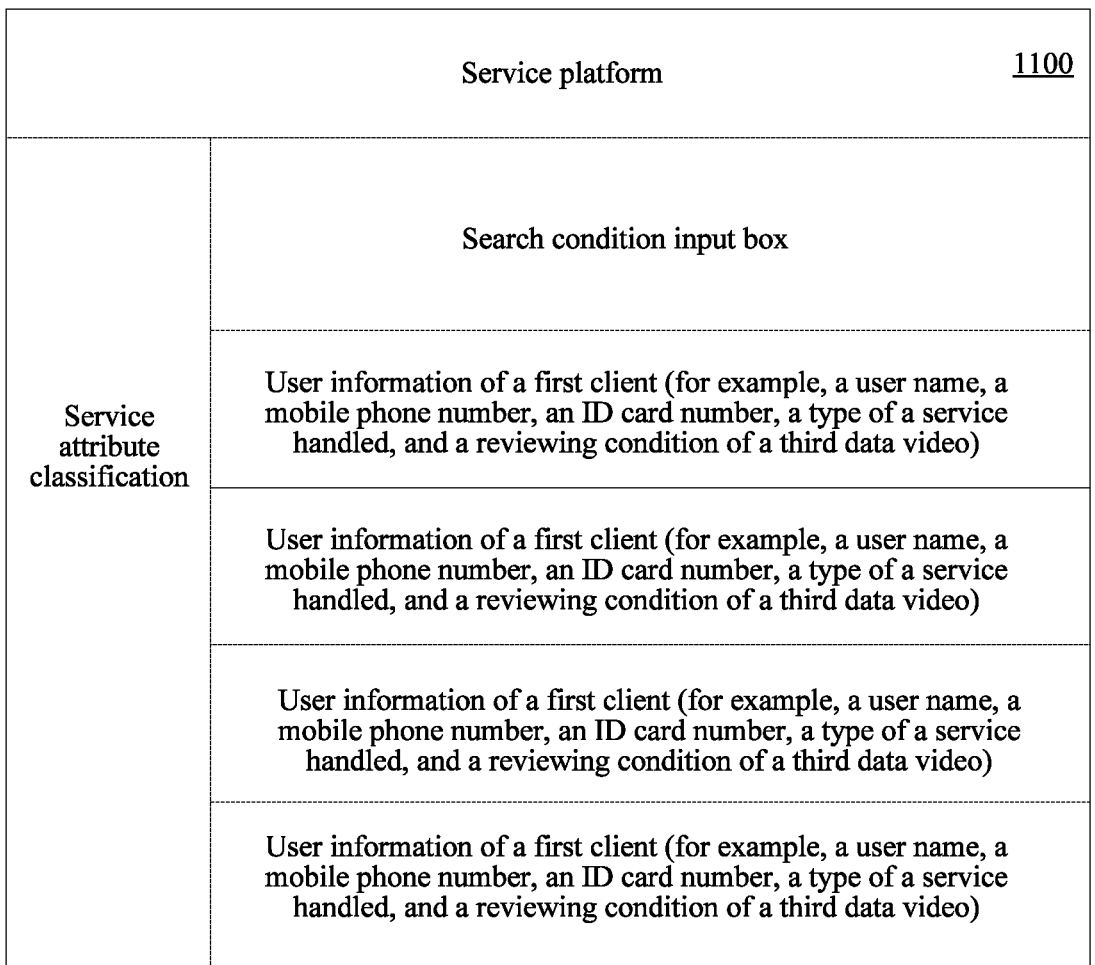
FIG. 11 is an embodiment of a storage interface of a service platform in an embodiment of the present disclosure.

During login of the second user (for example, a reviewer of the service provider), a service operation reviewing process is performed, including: The service client obtains the storage information from the service platform, where a storage information interface 1100 of the service platform is shown in FIG. 11; the service client transmits, to the cloud server 103 (the object storage COS server), an access request carrying the storage information; the service client receives a link address of the service operation video data which is transmitted by the cloud server 103 (the object storage COS server) in response to the access request; and the service client obtains the service operation video data according to the link address.

The access request carries user information of the service client (that is, user information of the second user); after the user information of the service client passes verification of the cloud server 103 (the object storage COS server), the step of receiving a link address of the service operation video data which is transmitted by the cloud server 103 (the object storage COS server) in response to the access request is performed.

The user information of the service client: a service provider identifier of the service provider and identity authentication information of a user of the service client (the second user).

Figure 12:
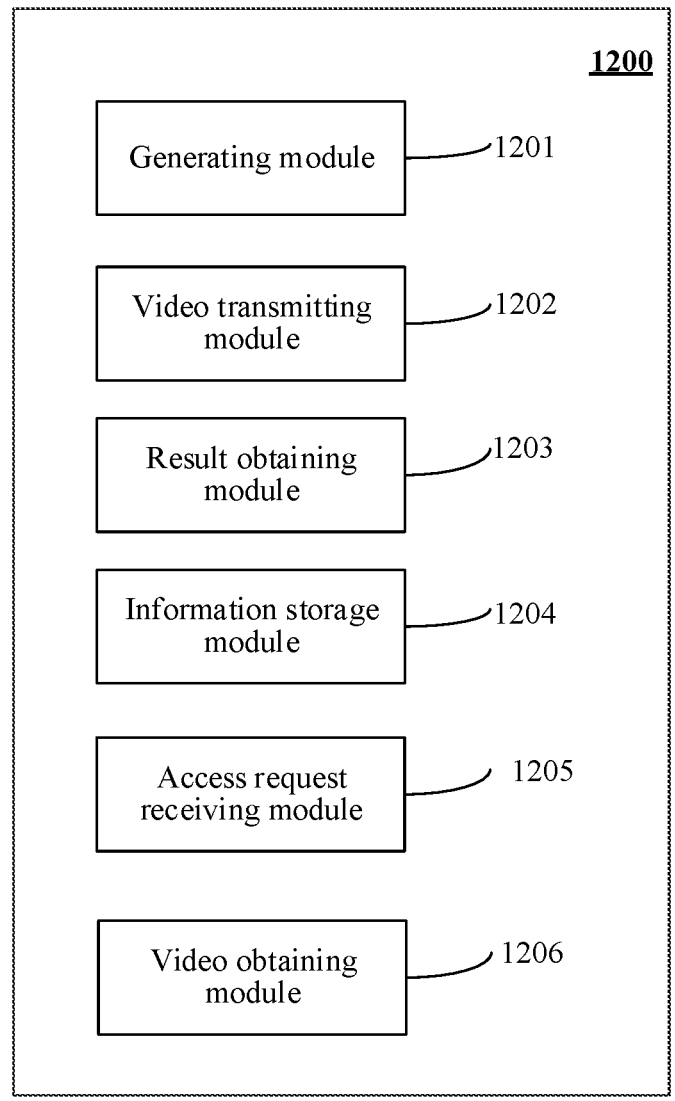
FIG. 12 is a schematic structural diagram of a processing apparatus according to an embodiment of the present disclosure.

Corresponding to the media data processing method 200 applied to a cloud server 103, the present disclosure further provides a media data processing apparatus 1200 applied to a cloud server 103. As shown in FIG. 12, the processing apparatus 1200 includes: a generating module 1201, a video transmitting module 1202, a result obtaining module 1203, an information storage module 1204, an access request receiving module 1205, and a video obtaining module 1206. Functions of the modules are specifically as follows:

The generating module 1201 is configured to obtain, in a case of determining that a user client performs a service operation with a first service client, first video data from the user client and second video data from the first service client; and synthesize the first video data with the second video data to generate service operation video data.

The video transmitting module 1202 is configured to transmit the service operation video data to the user client and the first service client, so that the first service client completes the service operation with the user client according to the service operation video data.

The result obtaining module 1203 is configured to obtain a processing result of the service operation from the first service client.

The information storage module 1204 is configured to store the service operation video data and generate storage information in response to the processing result indicating that the operation takes effect, and transmit the storage information of the service operation video data to the first service client, so that the first service client stores the storage information of the service operation video data into the service platform.

The access request receiving module 1205 is configured to receive an access request that is transmitted by a second service client and that carries the storage information.

The video obtaining module 1206 is configured to obtain, in response to the access request, the service operation video data according to the storage information and return the service operation video data to the second service client, so that the second service client completes processing for the service operation according to the service operation video data.

In some embodiments, the processing apparatus 1200 further includes: a connection request receiving module, configured to receive a video connection request transmitted by the user client; and a connection establishment module, configured to establish a video connection between the user client and the first service client in response to the video connection request, where the first video data and the second video data are obtained through the video connection after the video connection is established.

In some embodiments, the processing apparatus 1200 further includes: an information receiving module, configured to receive user authorization information sent by the user client; and a login information obtaining module, configured to obtain user login information of the user client according to the user authorization information, and transmit the user login information of the user client to the first service client, where in response to reception of the user login information of the user client transmitted by the first service client, the generating module 1201 is configured to determine that the user client performs a service operation with the first service client.

In some embodiments, the generating module 1201 includes: a first obtaining unit, configured to obtain, through a first secure transmission channel, a first encrypted video data stream transmitted by the user client; a second obtaining unit, configured to obtain, through a second secure transmission channel, a second encrypted video data stream transmitted by the first service client; a first decryption unit, configured to decrypt the obtained first encrypted video data stream to obtain a decrypted first video data stream; a second decryption unit, configured to decrypt the obtained second encrypted video data stream to obtain a decrypted second video data stream; and a mixing unit, configured to mix the decrypted first video data stream with the decrypted second video data stream to generate a service operation video data stream.

In some embodiments, the processing apparatus 1200 further includes: a detection module, configured to perform data stream detection on the first encrypted video data stream upon detection that the first encrypted video data stream transmitted by the user client arrives, where after the first encrypted video data stream passes the data stream detection, the first obtaining unit in the generating module 1201 performs the operation of obtaining a first encrypted video data stream transmitted by the user client.

In some embodiments, the video transmitting module 1202 includes: an encryption unit, configured to encrypt the service operation video data stream; a first transmitting unit, configured to transmit, through the first secure transmission channel, the encrypted service operation video data stream to the user client; and a second transmitting unit, configured to transmit, through the second secure transmission channel, the encrypted service operation video data stream to the first service client.

In some embodiments, the processing apparatus 1200 further includes: a user information obtaining module, configured to obtain user information from the first service client before the service operation video data is stored; a first verification module, configured to verify the user information of the first service client in response to reception of a storage request of the service operation video data, where the storage request carries the user information of the first service client; and a determining module, configured to store the service operation video data after the user information of the first service client passes the verification, and determine the storage information of the service operation video data, where the user information of the first service client includes a service provider identifier of a service provider to which the first service client belongs and identity authentication information of a user of the first service client.

In some embodiments, the information storage module 1204 includes: a storage unit, configured to store the service operation video data as a video file; a division unit, configured to divide the video file into at least two video data segments, generate corresponding video data segment index information according to the video data segments, and store the video data segments on at least two storage nodes in a distributed manner; and a determining unit, configured to store the video data segment index information and determine storage information of the video data segment index information.

In some embodiments, the video obtaining module 1206 includes: an obtaining unit, configured to obtain the video data segment index information according to the storage information; an aggregation unit, configured to aggregate the video data segments according to the video data segment index information to generate the service operation video data; a generating unit, configured to generate a link address of the service operation video data; and a transmitting unit, configured to transmit the link address to the second service client, so that the second service client obtains the service operation video data according to the link address.

In some embodiments, the access request further carries user information of the second service client; the processing apparatus 1200 further includes: a second verification module, configured to verify the user information of the second service client in response to the access request; the video obtaining module 1206 performs the operation of obtaining the service operation video data according to the storage information and returning the service operation video data to the second service client, after the user information of the second service client passes the verification, where the user information of the second service client includes a service provider identifier of a service provider to which the second service client belongs and identity authentication information of a user of the second service client.

In some embodiments, the processing apparatus 1200 further includes: a first creation module, configured to create a service provider identifier, a user identifier of the first service client, and identity authentication information of a user of the first service client for a service provider; and a first information transmitting module, configured to transmit the service provider identifier and the identity authentication information of the user of the first service client to the first service client in a case that user login information of the first service client is obtained, where after the service provider identifier and the identity authentication information of the user of the first service client are transmitted to the first service client, the user information obtaining module performs the operation of obtaining user information from the first service client.

In some embodiments, the processing apparatus 1200 further includes: a second creation module, configured to create a service provider identifier, a user identifier of the second service client, and identity authentication information of a user of the second service client for a service provider; and a second information transmitting module, configured to transmit the service provider identifier and the identity authentication information of the user of the second service client to the second service client in a case that user login information of the second service client is obtained, where after the service provider identifier and the identity authentication information of the user of the second service client are transmitted to the second service client, the access request receiving module 1205 performs the operation of receiving an access request that is transmitted by a second service client and that carries the storage information.

In some embodiments, the processing apparatus 1200 further includes: a first deletion module, configured to delete a record generated according to the video data segment index information and the generated link address after the service operation video data is obtained according to the storage information and returned to the second service client.

In some embodiments, the processing apparatus 1200 further includes: a second deletion module, configured to delete a record generated according to the video data segment index information and the generated link address at the end of a life cycle of the service operation video data.

In some embodiments, the processing apparatus 1200 further includes: a third information transmitting module, configured to transmit the storage information of the service operation video data to the first service client, so that the storage information is stored by the first service client into a service platform, to be obtained by the second service client.

Figure 13:
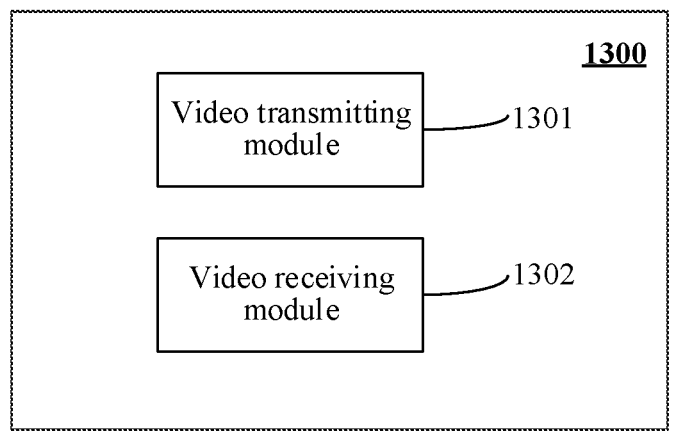
FIG. 13 is a schematic structural diagram of another processing apparatus according to an embodiment of the present disclosure.

Corresponding to the media data processing method 500 applied to a user client (such as a social APP), this embodiment further provides a media data processing apparatus 1300 applied to a user client (such as a social APP). As shown in FIG. 13, the processing apparatus 1300 includes: a video transmitting module 1301 and a video receiving module 1302. Functions of the modules are specifically as follows:

The video transmitting module 1301 is configured to transmit first video data to a cloud server, so that the cloud server synthesizes the first video data with second video data obtained from a service client, to generate service operation video data.

The video receiving module 1302 is configured to receive and display the service operation video data transmitted by the cloud server, so that the user client completes a service operation with the service client according to the service operation video data.

In some embodiments, the processing apparatus 1300 further includes: a display module, configured to display a service operation entrance provided by a platform of the service provider; a response module, configured to transmit a service operation request to the service client in response to a selection operation for the service operation entrance, where the service operation request carries user login information of the user client; and an instruction receiving module, configured to receive a video uploading instruction transmitted by the service client in response to the service operation request, where the video transmitting module 1301 performs the operation of transmitting the first video data to a cloud server in response to reception of the video uploading instruction.

In some embodiments, the processing apparatus 1300 further includes: an information transmitting module, configured to transmit authorization information to the cloud server in response to the received login authorization instruction, so that the cloud server obtains, according to the authorization information, user login information of the user client from an application server that the user client logs onto, where the response module performs the operation of transmitting the service operation request to the service client after the login authorization is completed.

In some embodiments, the processing apparatus 1300 further includes: a result receiving module, configured to transmit an obtaining request to the service client, and receive a processing result of the service operation transmitted by the service client in response to the obtaining request.

Figure 14:
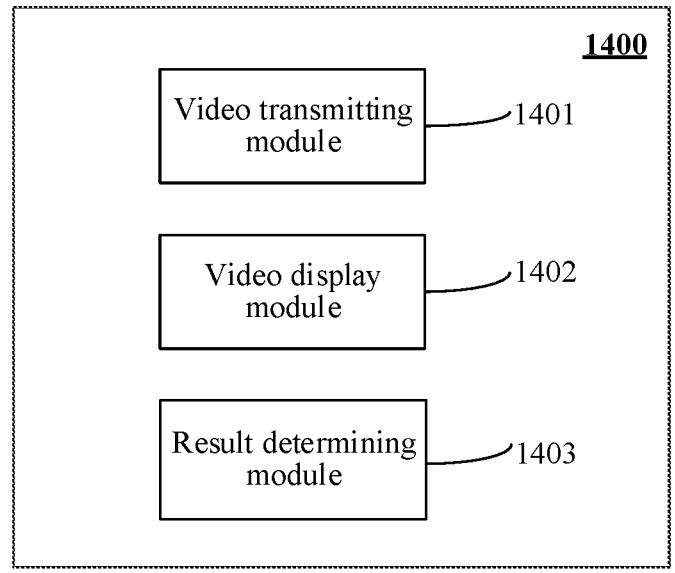
FIG. 14 is a schematic structural diagram of another processing apparatus according to an embodiment of the present disclosure.

Corresponding to the media data processing method 1000 applied to a service client (such as a web-version social application program), the present disclosure further provides a media data processing apparatus 1400 applied to a service client (such as a web-version social application program). The processing apparatus 1400 performs a service operation process during login of a first user (for example, an agent of a service provider). As shown in FIG. 14, the processing apparatus 1400 includes: a video transmitting module 1401, a video display module 1402, and a result determining module 1403. Functions of the modules are specifically as follows.

The video transmitting module 1401 is configured to transmit first video data to a cloud server, so that the cloud server synthesizes the first video data with second video data obtained from a user client to generate service operation video data.

The video display module 1402 is configured to receive and display the service operation video data transmitted by the cloud server, so that the service client completes a service operation with the user client according to the service operation video data The result determining module 1403 is configured to determine a processing result of the service operation and transmit the processing result to the cloud server.

In some embodiments, the processing apparatus 1400 further includes: a request receiving module, configured to receive a service operation request transmitted by the user client, where the service operation request carries user login information of the user client; and an instruction transmitting module, configured to transmit the video uploading instruction to the user client in response to the service operation request.

In some embodiments, the processing apparatus 1400 further includes: a storage information receiving module, configured to receive storage information of the service operation video data transmitted by the cloud server, and store the storage information into a service platform.

In some embodiments, the processing apparatus 1400 performs a service operation reviewing process during login of a second user; the processing apparatus includes: a storage information transmitting module, configured to obtain the storage information from the service platform, and transmit an access request carrying the storage information to the cloud server; an address receiving module, configured to receive a link address of the service operation video data which is transmitted by the cloud server in response to the access request; a video obtaining module, configured to obtain and display the service operation video data according to the link address; and a result storage module, configured to determine a reviewing result of a service operation corresponding to the service operation video data and store the reviewing result into the service platform.

In some embodiments, the access request carries user information of the service client; the address receiving module performs the operation of receiving a link address of the service operation video data which is transmitted by the cloud server in response to the access request, after the user information of the service client passes verification of the cloud server, where the user information of the service client includes: a service provider identifier of a service provider and identity authentication information of the second user.

In some embodiments, the processing apparatus 1400 further includes: an authorization information transmitting module, configured to transmit authorization information to the cloud server in response to a received login authorization instruction, so that the cloud server obtains, according to the authorization information, user login information of the service client from an application server that the service client logs onto; a request transmitting module, configured to transmit an obtaining request for the user information of the service client to the cloud server after login authorization is completed; and a user information receiving module, configured to receive the user information of the service client transmitted by the cloud server in response to the obtaining request, where the user information of the service client includes: the service provider identifier of the service provider and identity authentication information of a user of the service client.

Figure 15:
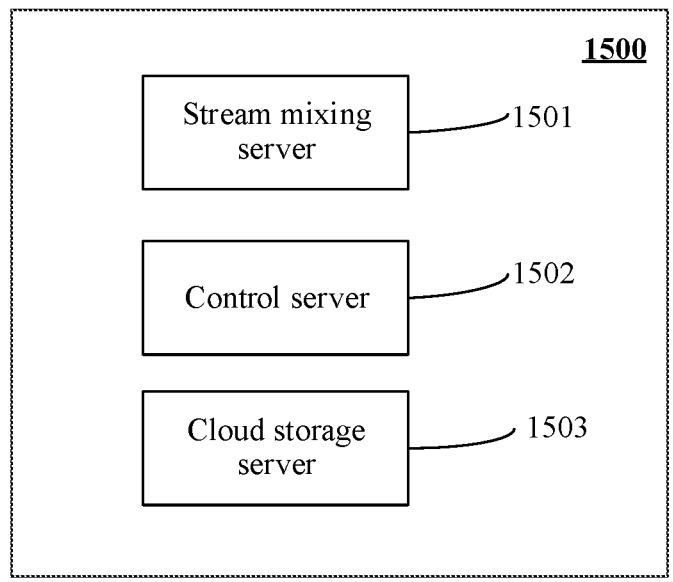
FIG. 15 is a schematic structural diagram of a processing system according to an embodiment of the present disclosure.

Corresponding to the media data processing apparatus 1200 applied to a cloud server 103, the present disclosure further provides a media data processing system 1500 applied to a cloud server 103. As shown in FIG. 15, the processing system 1500 includes: a stream mixing server 1501 and a cloud storage server 1503. Functions of the servers are specifically as follows:

The stream mixing server 1501 obtains, in a case of determining that a user client performs a service operation with a first service client, first video data from the user client and second video data from the first service client; and synthesizes the first video data with the second video data to generate service operation video data.

The stream mixing server 1501 transmits the service operation video data to the user client and the first service client, so that the first service client completes the service operation with the user client according to the service operation video data.

The stream mixing server 1501 obtains a processing result of the service operation from the first service client; and transmits a storage request of the service operation video data to the cloud storage server in response to the processing result indicating that the operation takes effect.

The cloud storage server 1503 stores the service operation video data, generates the storage information, and transmits the storage information to the stream mixing server in response to the storage request.

The stream mixing server 1501 transmits the storage information of the service operation video data to the first service client.

The cloud storage server 1503 receives an access request that is transmitted by the second service client and carries the storage information.

The cloud storage server 1503 obtains, in response to the access request, the service operation video data according to the storage information and returns the service operation video data to the second service client, so that the second service client completes processing for the service operation according to the service operation video data.

In some embodiments, the cloud storage server 1503 receives the user authorization information transmitted by the user client. The cloud storage server 1503 obtains user login information of the user client according to the user authorization information, and transmits the user login information of the user client to the first service client. In response to reception of the user login information of the user client transmitted by the first service client, the stream mixing server 1501 determines that the user client performs a service operation with the first service client.

In some embodiments, the stream mixing server 1501 obtains user information from the first service client before the service operation video data is stored. The cloud storage server 1503 verifies the user information of the first service client in response to reception of a storage request of the service operation video data, where the storage request carries the user information of the first service client. The cloud storage server 1503 stores the service operation video data after the user information of the first service client passes the verification, and determines the storage information of the service operation video data, where the user information of the first service client includes a service provider identifier of a service provider to which the first service client belongs and identity authentication information of a user of the first service client.

In some embodiments, the access request further carries user information of the second service client. The cloud storage server 1503 verifies the user information of the second service client in response to the access request. The cloud storage server 1503 performs the operation of obtaining the service operation video data according to the storage information and returning the service operation video data to the second service client, after the user information of the second service client passes the verification, where the user information of the second service client includes a service provider identifier of a service provider to which the second service client belongs and identity authentication information of a user of the second service client.

In some embodiments, the processing system further includes a control server 1502. The control server 1502 creates, in the cloud storage server 1503, a service provider identifier, a user identifier of the first service client, and identity authentication information of a user of the first service client for a service provider. The control server 1502 receives the service provider identifier, the user identifier of the first service client, and the identity authentication information of the user of the first service client that are transmitted by the cloud storage server. The cloud storage server 1503 transmits, to the control server 1502 in a case that user login information of the first service client is obtained, a message indicating that the user login information of the first service client is obtained. The control server 1502 transmits the service provider identifier and the user information of the first service client to the first service client in response to reception of the message indicating that the user login information of the first service client is obtained. After the control server 1502 completes the operation of transmitting the user information of the first service client to the first service client, the stream mixing server obtains the user information from the first service client.

In some embodiments, the control server 1502 creates, in the cloud storage server 1503, a user identifier of the second service client and identity authentication information of a user of the second service client for the service provider.

The control server 1502 receives the user identifier of the second service client and the identity authentication information of the user of the second service client that are transmitted by the cloud storage server 1503. The cloud storage server 1503 transmits, to the control server 1502 in a case that user login information of the second service client is obtained, a message indicating that the user login information of the second service client is obtained. The control server 1502 transmits the service provider identifier and the identity authentication information of the user of the second service client to the second service client in response to reception of the message indicating that the user login information of the second service client is obtained. After the control server 1502 completes the operation of transmitting the service provider identifier and the identity authentication information of the user of the second service client to the second service client, the cloud storage server 1503 performs the operation of receiving an access request that is transmitted by the second service client and carries the storage information.

The stream mixing server 1501 may be the stream mixing server described above, the control server 1502 may be the independent control server described above, and the cloud storage server 1503 may be the object storage COS server described above.

Figure 16:
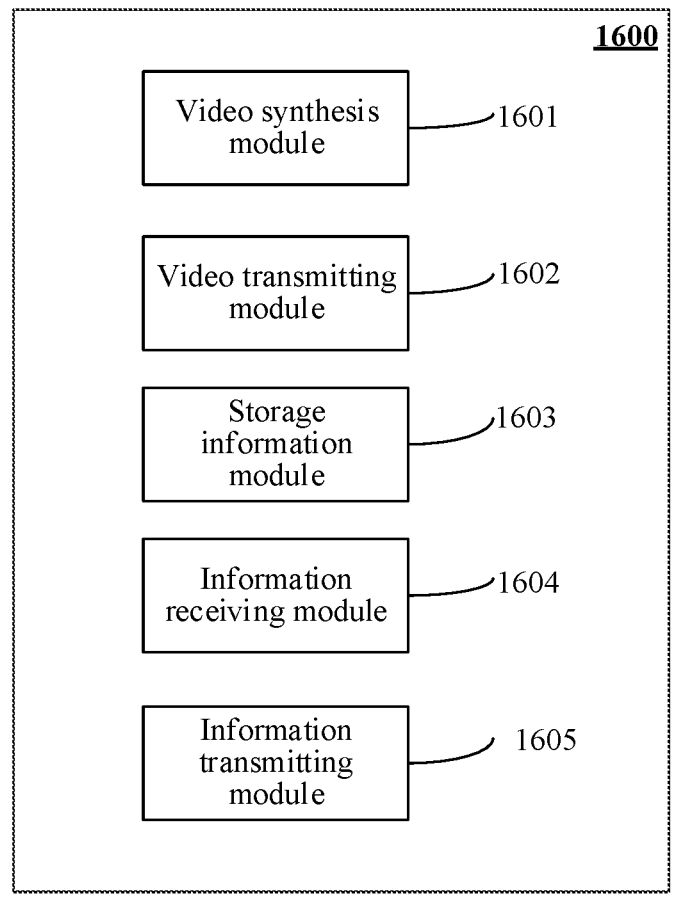
FIG. 16 is a schematic structural diagram of a server according to an embodiment of the present disclosure.

Corresponding to the media data processing system 1500 applied to a cloud server 103, the present disclosure further provides a server 1600 applied to a cloud server 103. As shown in FIG. 16, the server 1600 includes: a video synthesis module 1601, a video transmitting module 1602, a storage information module 1603, an information receiving module 1604, and an information transmitting module 1605.

The video synthesis module 1601 is configured to obtain, in a case of determining that a user client performs a service operation with a first service client, first video data from the user client and second video data from the first service client; and synthesize the first video data with the second video data to generate service operation video data.

The video transmitting module 1602 is configured to transmit the service operation video data to the user client and the first service client, so that the first service client completes the service operation with the user client according to the service operation video data.

The storage information module 1603 is configured to obtain a processing result of the service operation from the first service client, and transmit a storage request for the service operation video data to a cloud storage server in response to the processing result indicating that the operation takes effect.

The information receiving module 1604 is configured to receive the storage information that is transmitted by the cloud storage server in response to the storage request.

The information transmitting module 1605 is configured to transmit the storage information of the service operation video data to the first service client, so that the second service client obtains the service operation video data according to the storage information.

Figure 17:
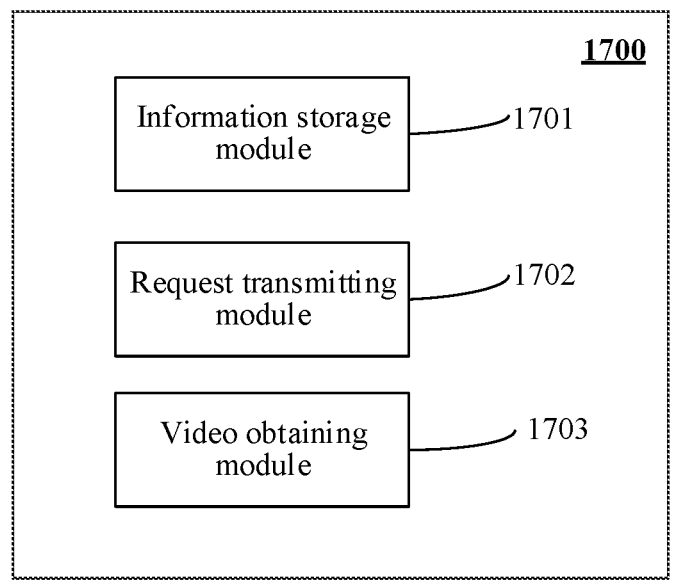
FIG. 17 is a schematic structural diagram of another server according to an embodiment of the present disclosure.

Corresponding to the media data processing system 1500 applied to a cloud server 103. The present disclosure further provides a server 1700 applied to a cloud server 103. As shown in FIG. 17, the server 1700 includes: an information storage module 1701, a request transmitting module 1702, and a video obtaining module 1703.

The information storage module 1701 is configured to store the service operation video data, generate storage information, and transmit the storage information to the stream mixing server in response to a storage request transmitted by the stream mixing server.

The request transmitting module 1702 is configured to receive an access request that is transmitted by a service client and carries the storage information.

The video obtaining module 1703 is configured to obtain the service operation video data according to the storage information and return the service operation video data to the service client (for example, a web-version social application program of a reviewer of a service provider) in response to the access request, so that the service client completes processing for the service operation according to the service operation video data.

Figure 18:
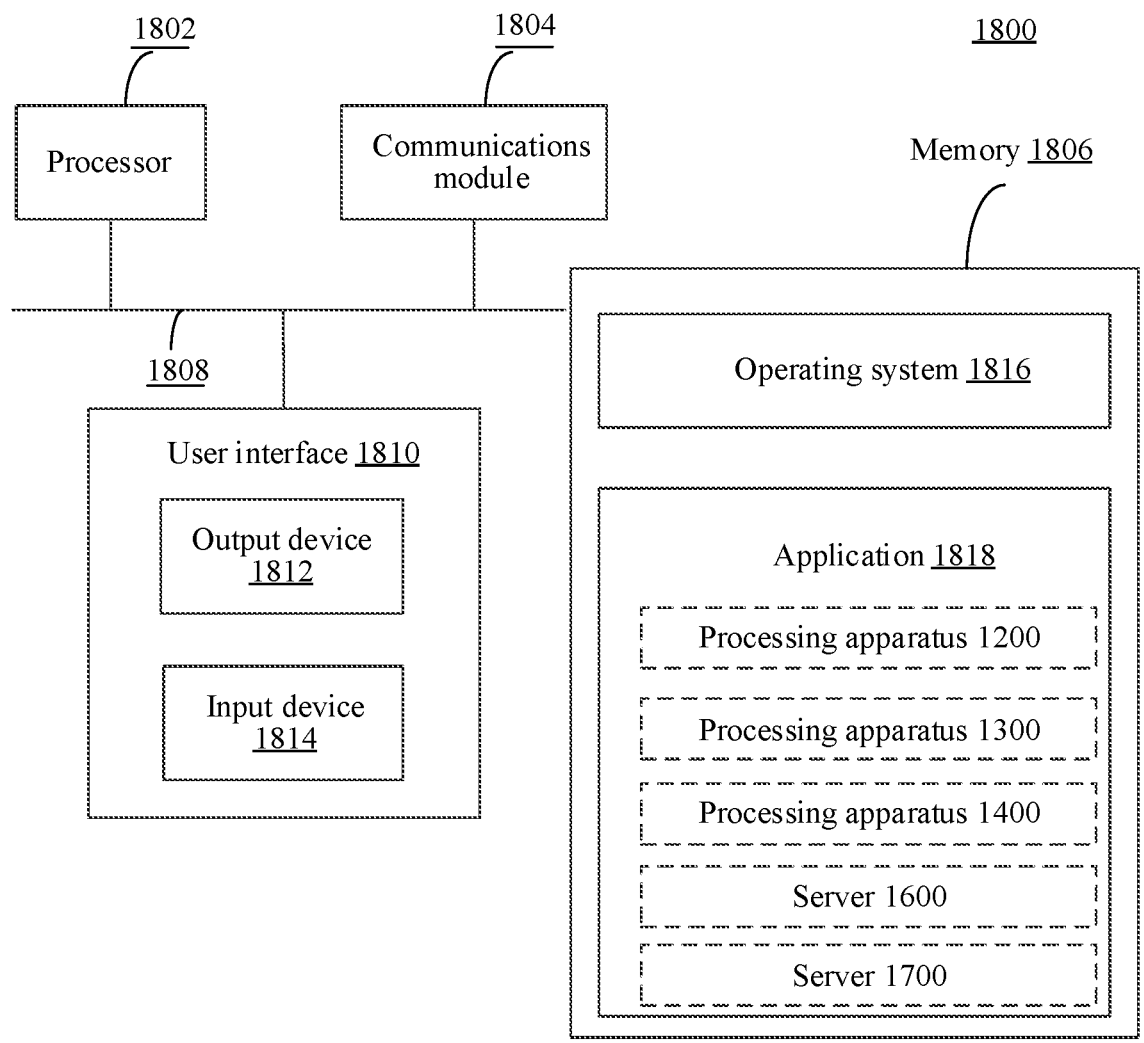
FIG. 18 is a schematic structural diagram of hardware of a computing device according to an embodiment of the present disclosure.

FIG. 18 is a composition structural diagram of a computing device 1800 where a processing apparatus 1200, a processing apparatus 1300, a processing apparatus 1400, a server 1600 or a server 1700 is located. The computing device 1800 may implement a cloud server or a terminal device or any other device. As shown in FIG. 18, the computing device includes one or more processors (CPU) 1802, a communications module 1804, a memory 1806, a user interface 1810, and a communications bus 1808 for interconnecting these components.

The processor 1802 may receive and transmit data through the communications module 1804 to implement network communication and/or local communication.

The user interface 1810 includes one or more output devices 1812, including one or more loudspeakers and/or one or more visual displays. The user interface 1810 also includes one or more input devices 1814, including, for example, a keyboard, a mouse, a voice command input unit or a microphone, a touch display, a touch-sensitive input panel, a posture capture camera, or another input button or control.

The memory 1806 may be a high-speed random access memory, such as a DRAM, SRAM, DDR, RAM, or other random access solid-state storage devices, or a non-volatile memory, such as one or more magnetic disk storage devices, an optical storage device, a flash memory device, or other non-volatile solid-state storage devices.

The memory 1806 stores an instruction set executable by the processor 1802, including: an operating system 1816, including a program for processing various basic system services and executing a hardware-related task; and an application 1818, including various application programs for playing videos, where the application program can implement processing procedures in the foregoing embodiments; for example, the application program may include some or all of the modules in the processing apparatus 1200 shown in FIG. 12; at least one of the modules 1201-1206 may store a machine executable instruction, and the processor 1802 can implement the function of at least one of the modules 1201-1206 by executing the machine executable instruction in at least one of the modules 1201-1206 in the memory 1806.

The application program may also include some or all of the modules in the processing apparatus 1300 shown in FIG. 13; at least one of the modules 1301-1302 may store a machine executable instruction, and the processor 1802 can implement the function of at least one of the modules 1301-1302 by executing the machine executable instruction in at least one of the modules 1301-1302 in the memory 1806.

The application program may also include some or all of the modules in the processing apparatus 1400 shown in FIG. 14. At least one of the modules 1401-1403 may store a machine executable instruction, and the processor 1802 can implement the function of at least one of the modules 1401-1403 by executing the machine executable instruction in at least one of the modules 1401-1403 in the memory 1806.

Alternatively, the application program may also include some or all of the modules in the server 1600 shown in FIG. 16; at least one of the modules 1601-1605 may store a machine executable instruction, and the processor 1802 can implement the function of at least one of the modules 1601-1605 by executing the machine executable instruction in at least one of the modules 1601-1605 in the memory 1806.

Alternatively, the application program may also include some or all of the modules in the server 1700 shown in FIG. 17; at least one of the modules 1701-1703 may store a machine executable instruction, and the processor 1802 can implement the function of at least one of the modules 1701-1703 by executing the machine executable instruction in at least one of the modules 1701-1703 in the memory 1806. Not all steps and modules in the procedures and structural diagrams are mandatory, and some steps or modules may be ignored according to actual requirements. An execution sequence of the steps is not fixed, and may be adjusted as required. The division of the modules is merely for facilitating the functional division used. During practical application, one module may be implemented by multiple modules, and functions of multiple modules may also be implemented by the same module. The modules may be located in the same device, or may be located in different devices.

The hardware modules in the embodiments may be implemented by hardware or by a hardware platform with software. The software includes machine-readable instructions, and are stored in a non-volatile storage medium. Therefore, the embodiments may also be embodied as a software product.

In the embodiments, hardware may be implemented by dedicated hardware or by hardware executing a machine readable instruction. For example, the hardware may be a specially designed permanent circuit or logical device (for example, an application specific processor, such as an FPGA or an ASIC) configured to complete specific operations. The hardware may also include a programmable logical device or circuit (for example, including a general purpose processor or another programmable processor) that is temporarily configured by software and is configured to perform specific operations.

In addition, each embodiment of the present disclosure may be implemented by a data processing device, for example, a data processing program executed by a computer. Obviously, the data processing program constitutes the present disclosure. In addition, the data processing program generally stored in a storage medium is executed in the following manner: directly reading the program from the storage medium or installing or copying the program into a storage device (such as a hard disk or a memory) of a data processing device. Therefore, the storage medium also constitutes the present disclosure. The present disclosure further provides a non-volatile storage medium, which stores a data processing program. The data processing program may be configured to perform any embodiment of the foregoing method embodiments in the present disclosure.

Machine readable instructions corresponding to the modules in FIG. 12 to FIG. 14, FIG. 16, and FIG. 17 can cause an operating system running on a computer to complete some or all of operations described herein. The non-volatile computer readable storage medium may be written into a memory disposed in an expansion board inserted into a computer or written into a memory disposed in an expansion unit connected to a computer. A CPU installed on the expansion board or the expansion unit may execute some or all practical operations according to instructions.

In addition, the apparatuses and modules in the embodiments of the present disclosure may be integrated in a processing unit, or each module may exist alone physically, or two or more apparatuses or modules are integrated in one unit. The integrated unit may be implemented by hardware, or implemented by a software functional unit.

The above descriptions are merely preferred embodiments of the present disclosure, but are not intended to limit the present disclosure. Any modification, equivalent replacement, or improvement made without departing from the spirit and principle of the present disclosure should fall within the scope of the present disclosure.

What is claimed is:

1. A media data processing method, comprising:
   obtaining, by a cloud server and after determining that a user client performs a service operation with a first service client, first video data from the user client and second video data from the first service client, and synthesizing the first video data with the second video data to generate service operation video data;
   transmitting, by the cloud server, the service operation video data to the user client and the first service client, so that the first service client completes the service operation with the user client according to the service operation video data;
   obtaining, by the cloud server, a processing result of the service operation from the first service client;
   storing, by the cloud server, the service operation video data and generating storage information, in response to the processing result indicating that the service operation takes effect;
   transmitting, by the cloud server, the storage information to the first service client, wherein the storage information is stored in a service platform and transmitted from the first service client to a second service client different than the first service client, and wherein an access request carrying the storage information is transmitted from the second service client to the cloud server;

receiving, by the cloud server, the access request that is transmitted by the second service client and that carries the storage information; and obtaining, by the cloud server in response to the access request, the service operation video data according to the storage information and returning the service operation video data to the second service client, so that the second service client completes processing for the service operation according to the service operation video data.

2. The processing method according to claim 1, wherein obtaining the first video data from the user client and the second video data from the first service client, and synthesizing the first video data with the second video data to generate the service operation video data comprises:

obtaining, through a first secure transmission channel, a first encrypted video data stream transmitted by the user client;

obtaining, through a second secure transmission channel, a second encrypted video data stream transmitted by the first service client;

decrypting the first encrypted video data stream to obtain a decrypted first video data stream;

decrypting the second encrypted video data stream to obtain a decrypted second video data stream; and mixing the decrypted first video data stream with the decrypted second video data stream to generate a service operation video data stream.

3. The processing method according to claim 2, further comprising:

performing data stream detection on the first encrypted video data stream upon detection that the first encrypted video data stream transmitted by the user client arrives; and obtaining the first encrypted video data stream transmitted by the user client after the first encrypted video data stream passes the data stream detection.

4. The processing method according to claim 2, wherein transmitting the service operation video data to the user client and the first service client comprises:

encrypting the service operation video data stream to obtain an encrypted service operation video data stream;

transmitting, through the first secure transmission channel, the encrypted service operation video data stream to the user client; and transmitting, through the second secure transmission channel, the encrypted service operation video data stream to the first service client.

5. The processing method according to claim 1, wherein storing the service operation video data comprises:

storing the service operation video data as a video file;

dividing the video file into at least two video data segments; and generating video data segment index information according to the at least two video data segments.

6. The processing method according to claim 5, wherein obtaining the service operation video data according to the storage information and returning the service operation video data to the second service client comprises:

aggregating the at least two video data segments according to the video data segment index information to generate the service operation video data;

generating a link address of the service operation video data; and transmitting the link address to the second service client, so that the second service client obtains the service operation video data according to the link address.

7. The processing method according to claim 1, further comprising:

obtaining user information from the first service client before the service operation video data is stored;

verifying the user information of the first service client in response to reception of a storage request of the service operation video data, wherein the storage request carries the user information of the first service client; and storing the service operation video data after the user information of the first service client passes the verification.

8. The processing method according to claim 1, wherein: the access request further carries user information of the second service client; and the method further comprises:

verifying the user information of the second service client in response to the access request; and obtaining the service operation video data according to the storage information and returning the service operation video data to the second service client, after the user information of the second service client passes the verification.

9. The processing method according to claim 1, further comprising:

transmitting the storage information of the service operation video data to the first service client, so that the storage information is stored by the first service client into the service platform.

10. The processing method according to claim 1, further comprising:

receiving user authorization information transmitted by the user client; and obtaining user login information of the user client according to the user authorization information, and transmitting the user login information of the user client to the first service client.

11. A computing device, comprising: a memory storing computer readable instructions; and a processor coupled to the memory and executing the computer readable instructions in the memory to perform:

obtaining, after determining that a user client performs a service operation with a first service client, first video data from the user client and second video data from the first service client, and synthesizing the first video data with the second video data to generate service operation video data;

transmitting the service operation video data to the user client and the first service client, so that the first service client completes the service operation with the user client according to the service operation video data;

obtaining a processing result of the service operation from the first service client;

storing the service operation video data and generate storage information in response to the processing result indicating that the service operation takes effect;

transmitting, by the cloud server, the storage information to the first service client, wherein the storage information is stored in a service platform and transmitted from the first service client to a second service client different than the first service client, and wherein an access request carrying the storage information is transmitted from the second service client to the cloud server;

receiving the access request that is transmitted by the second service client and that carries the storage information; and obtaining, in response to the access request, the service operation video data according to the storage information and return the service operation video data to the second service client, so that the second service client completes processing for the service operation according to the service operation video data.

12. The computing device according to claim 11, wherein the processor is further configured to execute the computer readable instructions to perform:

obtaining, through a first secure transmission channel, a first encrypted video data stream transmitted by the user client;

obtaining, through a second secure transmission channel, a second encrypted video data stream transmitted by the first service client;

decrypting the obtained first encrypted video data stream to obtain a decrypted first video data stream;

decrypting the obtained second encrypted video data stream to obtain a decrypted second video data stream; and mixing the decrypted first video data stream with the decrypted second video data stream to generate a service operation video data stream.

13. The computing device according to claim 12, wherein the processor is further configured to execute the computer readable instructions to perform:

encrypting the service operation video data stream to obtain an encrypted service operation video data stream;

transmitting, through the first secure transmission channel, the encrypted service operation video data stream to the user client; and transmitting, through the second secure transmission channel, the encrypted service operation video data stream to the first service client.

14. The computing device according to claim 11, wherein the processor is further configured to execute the computer readable instructions to perform:

storing the service operation video data as a video file;

dividing the video file into at least two video data segments; and generating corresponding video data segment index information according to the at least two video data segments.

15. The computing device according to claim 14, wherein the processor is further configured to execute the computer readable instructions to perform:

aggregating the at least two video data segments according to the video data segment index information to generate the service operation video data;

generating a link address of the service operation video data; and transmitting the link address to the second service client, so that the second service client obtains the service operation video data according to the link address.

16. The computing device according to claim 11, wherein the processor is further configured to execute the computer readable instructions to perform:

obtaining user information from the first service client before the service operation video data is stored;

verifying the user information of the first service client in response to reception of a storage request of the service operation video data, wherein the storage request carries the user information of the first service client; and storing the service operation video data after the user information of the first service client passes the verification.

17. The computing device according to claim 11, wherein:

the access request further carries user information of the second service client; and the processor is further configured to execute the computer readable instructions to perform:

verifying the user information of the second service client in response to the access request; and obtaining the service operation video data according to the storage information and returning the service operation video data to the second service client, after the user information of the second service client passes the verification.

18. The computing device according to claim 11, wherein the processor is further configured to execute the computer readable instructions to perform:

transmitting the storage information of the service operation video data to the first service client, so that the storage information is stored by the first service client into the service platform.

19. The computing device according to claim 11, wherein the processor is further configured to execute the computer readable instructions to perform:

receiving user authorization information transmitted by the user client; and obtaining user login information of the user client according to the user authorization information, and transmit the user login information of the user client to the first service client.

20. A non-transitory computer-readable storage medium storing computer program instructions executable by at least one processor to perform:

obtaining, after determining that a user client performs a service operation with a first service client, first video data from the user client and second video data from the first service client, and synthesizing the first video data with the second video data to generate service operation video data;

transmitting the service operation video data to the user client and the first service client, so that the first service client completes the service operation with the user client according to the service operation video data;

obtaining a processing result of the service operation from the first service client;

storing the service operation video data and generating storage information, in response to the processing result indicating that the service operation takes effect;

transmitting, by the cloud server, the storage information to the first service client, wherein the storage information is stored in a service platform and transmitted from the first service client to a second service client different than the first service client, and wherein an access request carrying the storage information is transmitted from the second service client to the cloud server;

receiving the access request that is transmitted by the second service client and that carries the storage information; and obtaining, in response to the access request, the service operation video data according to the storage information and returning the service operation video data to the second service client, so that the second service client completes processing for the service operation according to the service operation video data.

\* \* \* \* \*